United States Patent
Takata et al.

(10) Patent No.: US 6,379,252 B2
(45) Date of Patent: *Apr. 30, 2002

(54) GAME PROGRAM SUPPLY SYSTEM AND PROGRAM REWRITE SYSTEM

(75) Inventors: Akira Takata; Takahiro Masuda; Toshihiro Satou; Tetsuji Kajitani; Masashi Kuramoto, all of Osaka (JP)

(73) Assignee: Mega Chips Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,512
(22) PCT Filed: Mar. 28, 1997
(86) PCT No.: PCT/JP97/01064
 § 371 Date: Nov. 28, 1997
 § 102(e) Date: Nov. 28, 1997
(87) PCT Pub. No.: WO97/36229
 PCT Pub. Date: Oct. 2, 1997

(30) Foreign Application Priority Data

| Mar. 28, 1996 | (JP) | 8-074640 |
| Jun. 21, 1996 | (JP) | 8-161808 |
| Jul. 19, 1996 | (JP) | 8-191061 |
| Nov. 13, 1996 | (JP) | 8-301696 |

(51) Int. Cl.[7] .................... A63F 13/12
(52) U.S. Cl. ........................ 463/43; 463/40
(58) Field of Search ............ 463/41–45, 25, 463/40; 273/148, 148 B; 364/410

(56) References Cited

U.S. PATENT DOCUMENTS

| 4,247,106 A | * | 1/1981 | Jeffers et al. | 273/237 |
| 4,799,635 A | * | 1/1989 | Nakagawa | 463/43 |
| 4,858,930 A | * | 8/1989 | Sato | 463/44 |
| 4,905,280 A | * | 2/1990 | Wiedemer | 364/410 |
| 5,014,982 A | * | 5/1991 | Okada et al. | 463/44 |
| 5,256,863 A | * | 10/1993 | Ferguson et al. | 235/383 |
| 5,395,112 A | * | 3/1995 | Darlington | 463/44 |
| 5,634,848 A | * | 6/1997 | Tsuda et al. | 463/40 |
| 5,664,778 A | * | 9/1997 | Kikuchi et al. | 463/42 |

* cited by examiner

Primary Examiner—Jessica J. Harrison
Assistant Examiner—Corbett Coburn
(74) Attorney, Agent, or Firm—Oblon, Spivak, McClelland, Maier & Neustadt, P.C.

(57) ABSTRACT

The present invention relates to a game program rewrite system for supplying data of a game program of a plurality of terminal stations from a host station and writing the data in portable information storage media applied to game execution units in the terminal stations in response to requests, and a program rewrite system suitable for this game program supply system, and aims at enabling construction of a game-on-demand system including a number of terminal stations with no excess of requirement to equipment of a network or the data throughput of the host station.

In order to attain the above object, a host station (1) supplies data of a game program to a terminal station (2) online through a communication network. The data of the game program is supplied to the terminal station (2) offline too. The data of the game program preserved in the terminal station (2) is written in a game execution storage medium (20) in response to a request of a user.

3 Claims, 20 Drawing Sheets

FIG. 10

CASSETTE SPECIFICATION 1

(A)

| BANK 3 | BANK 2 | BANK 1 | BANK 0 | BANK \ ADDRESS |
|---|---|---|---|---|
| | | | | FFFFH |
| FREE | FREE | ROM | ROM | |
| | | FREE | | 8000H |
| | | RAM | FREE | |
| | | | | 0000H |

CASSETTE SPECIFICATION 2

(B)

| BANK 3 | BANK 2 | BANK 1 | BANK 0 | BANK \ ADDRESS |
|---|---|---|---|---|
| | | | | FFFFH |
| ROM | ROM | ROM | ROM | |
| FREE | FREE | | | 8000H |
| RAM | RAM | | | |
| | | | | 0000H |

INTERFACE WITH EXTERIOR

GAME MACHINE BODY MOUNT SIDE

GAME PROGRAM DATA REWRITE MACHINE MOUNT SIDE

GAME MACHINE BODY MOUNT SIDE

GAME PROGRAM SUPPLY SYSTEM AND PROGRAM REWRITE SYSTEM

TECHNICAL FIELD

The present invention relates to a game program supply system supplying data of game programs of a plurality of terminal stations from a host station for writing the data in portable information storage media applied to game execution units in response to requests in the terminal stations, and a program rewrite system suitable for this game program supply system.

BACKGROUND TECHNIQUE

In case of supplying data (the so-called game software) of game programs for executing games in game machines or personal computers in a game-on-demand manner, it is conceivable to construct a system connecting a host station and a plurality of terminal stations with each other through a network of public lines or dedicated lines so that the terminal station sides present requests for data to the host station and the host station provides the data to the terminal stations making the requests each time fully in response to the requests.

In case of considering such case that a number of terminal stations simultaneously present requests to the host station in such a system, however, there arises such a problem that the terminal station sides cannot download the data from the host station side due to restriction of the line number, unless the line number of the public lines or dedicated lines is prepared in a number having a possibility of simultaneously presenting requests for data to the host station.

Further, there is also such a problem that, even if a line number capable of responding to requests of a number of terminal stations is ensured, the host station must simultaneously return responses to the respective terminal stations making the requests independently of each other when such requests concentrate, improvement of the throughput of the host station is required as the number of the terminal stations increases, and the data throughput required to the host station remarkably increases depending on the terminal station number and the line number.

DISCLOSURE OF THE INVENTION

The present invention has been proposed in order to solve the aforementioned problems, and aims at providing a game program supply system which can construct a game-on-demand system including a number of terminal stations with no excess of requirement to equipment of a network or data throughput of a host station, and a program rewrite system suitable for this game program supply system.

A game program supply system of a first invention comprises a host station which is a supplier of data of a game program and a plurality of terminal stations which are connected to the host station through a communication network to be supplied with the data of the game program from the host station through the communication network online while being separately supplied with the data of the game program offline too, and each of the plurality of terminal stations is formed to comprise readable/writable first storage means preserving the data of the data program online-supplied from the host station through the communication network, read-only second storage means to be separately supplied with the data of the game program offline, and write means writing the data of the game program stored in the first or second storage means into a portable information storage medium applied to a game execution unit.

A game program supply system of a second invention is so formed that writing preservation of the data with respect to the first storage means is managed by the host station.

A game program supply system of a third invention is so formed that the communication network includes a satellite communication network and a ground communication network, so that the host station supplies encrypted data of the game program to the terminal stations through the satellite communication network while supplying key information for decrypting the cryptogram through the ground communication network.

A game program supply system of a fourth invention comprises a POS system having a plurality of POS terminals and a game program data rewrite machine connected to each of the plurality of POS terminals, and the game program data rewrite machine is formed to comprise storage means for storing data of a game program, and write means writing the data of the game program stored in the storage means into a portable information storage medium applied to a game execution unit.

A game program supply system of a fifth invention is a game program supply system supplying data of a game program by a game program data rewrite machine, wherein the game program data rewrite machine comprises storage means for storing the data of the game program and write means writing the data of the game program stored in the storage means into a game cassette which is a portable information storage medium applied to a game execution unit, the game program includes game programs of a plurality of types of specifications responsive to the specification of the game cassette, and the information storage medium is formed to comprise specification selecting means in which operations responsive to the plurality of types of specifications are previously defined for implementing a specification suitable to the game program by executing the operation responsive to the written game program.

A game program supply system of a sixth invention is a game program supply system for supplying data of a game program by a game program data rewrite machine, wherein the game program data rewrite machine comprises storage means for storing the data of the game program, and write means writing the data of the game program stored in the storage means into a game cassette which is a portable information storage medium applied to a game execution unit, and the game cassette is formed to comprise a flash memory rewritably storing the game program, and an interface authorizing access between the flash memory and, the game program data rewrite machine and the game execution unit.

In a game program supply system of a seventh invention, the interface is formed to comprise a first interface dedicated to the game program data rewrite machine authorizing access between the flash memory and the game program rewrite machine, and a second interface dedicated to the game execution unit authorizing access between the flash memory and the game execution unit.

In a game program supply system of an eighth invention, the game cassette further comprises a security circuit provided between the flash memory and the first interface, and the security circuit is so formed as to store a previously determined key value specific to the game program data supplied from the game program data rewrite machine in advance of supply of the game program data to be rewritten in case of rewriting the data of the flash memory by the game program data rewrite machine, for performing a prescribed operation on the game program data thereafter supplied and authorizing writing of the game program data into the flash memory only when the value of the operation coincides with the key value.

A program rewrite system of a ninth invention is a system of rewriting data of a program into a rewrite medium which is a portable information storage medium by a rewrite machine, wherein the rewrite medium comprises a semiconductor memory rewritably storing the data of the program, a memory control part controlling an operation of the semiconductor memory, and a first operation circuit, the program data rewrite machine comprises a storage medium for storing the data of the program, write means writing the data of the program stored into the storage medium in the rewrite medium, a second operation circuit, and data set means, the data set means inputs common data into the first and second operation circuits in case of connecting the rewrite medium to the rewrite machine for performing rewriting of the program, and the memory control part is formed to authorize writing into the semiconductor memory only when data of operation results of the first and second operation circuits are identical to each other.

In a program rewrite system of a tenth invention, the memory control part is so formed as to authorize writing into the semiconductor memory only in relation to writing from the memory control part while writing prescribed data into the semiconductor memory when the data of the operation results of the first and second operation circuits are identical to each other, and to authorize writing from the rewrite machine into the semiconductor memory only when coincidence is obtained as a result of reading the data from the semiconductor memory and comparing these data with each other.

A program rewrite system of an eleventh invention is a program rewrite system rewriting data of a program into a rewrite medium which is a portable information storage medium by a rewrite machine, wherein the rewrite medium comprises a semiconductor memory rewritably storing the data of the program, and a memory control part controlling an operation of the semiconductor memory, and the memory control part is formed to transit among a plurality of operation modes including a mode authorizing writing with respect to the semiconductor memory and a mode inhibiting the same.

In a program rewrite system of a twelfth invention, the rewrite medium further comprises an operation circuit and a comparator, the operation circuit executes an operation with respect to the data sent from the rewrite machine, the comparator performs comparison between data of an operation result of the operation circuit and another data sent from the rewrite machine, the plurality of operation modes are first to fourth operation modes, the memory control part first enters the first operation mode when the rewrite medium is connected to the rewrite machine for inhibiting writing into the semiconductor memory in the first operation mode, and transits to the second operation mode when the two data compared by the comparator do not coincide with each other for transiting to the third operation mode when the same coincide with each other, the memory control part stops its operation while inhibiting writing into the semiconductor memory in the second operation mode, the memory control part authorizes writing into the semiconductor memory only in relation to writing from the memory control part in the third operation while writing prescribed data into the semiconductor memory, further reading data, transiting to the second operation mode if these data do not coincide with each other or transiting to the fourth operation mode when the same coincide with each other, and the memory control part is formed to authorize writing from the rewrite machine into the semiconductor memory in the fourth operation mode.

According to the game program supply system of the first invention, the data of the game program are subjected to supply of two systems of online and offline ones, whereby the data can be mobily supplied at any time and the system is also suitable for preservation of mass data at the terminal stations, and this is a system writing the data of the game program into information storage media for game execution at the terminal stations in response to requests from users, whereby requirement to equipment of the communication network or the data throughput of the host station does not become excessive even if a number of terminal stations are included, and it is possible to construct a game program supply system which can supply the data of the game program to the users on demand.

According to the game program supply system of the second invention, the contents of writing preservation control to be performed by the host station may be identical for any terminal station, whereby there is such an effect that the load of the host station is not in the least influenced even if the number of the terminal stations increases particularly when simultaneous broadcast communication is employed.

According to the game program supply system of the third invention, it is possible to bring encrypted data of the game program into simultaneous broadcast communication to a number of terminal stations through the satellite communication network without causing an unreceivable region, and a data theft preventing effect increases since the key information for decryption is sent through the hardly interceptable ground communication network.

According to the game program supply system of the fourth invention, there are such effects that it is possible to readily construct a security management system, it is possible to simplify the operation of the game program data rewrite machine for facilitating its skill, and that, as to construction of the overall system, this is implementable at a low cost.

According to the game program supply system of the fifth invention, there are such effects that, even if there exist game cassettes of various specifications depending on the type of the game or the like, it is possible to cope with the various specifications by simply preparing a game cassette of one specification applied to the game program data rewrite machine, and a system of high practicalness can be constructed.

According to the game program supply system of the sixth invention, there is such an effect that a game cassette capable of rewriting the game program can be readily structured.

According to the game program supply system of the seventh invention, there are such effects that it becomes possible to directly mount the game cassette to a generally existing game machine body through no mounting adapter, and a game program supply system employing a rewritable game cassette can be economically constructed without requiring additional component purchase to the users.

According to the game program supply system of the eighth invention, there is such an effect that it is possible to prevent illegal rewriting having a game program data which is not legally supplied for rewriting as a rewrite source with respect to a rewritable game cassette.

According to the program rewrite system of the ninth invention, writing into the semiconductor memory is authorized only when operation results of two operation circuits coincide with each other, whereby writing of the program into the semiconductor memory becomes impossible when either the rewrite machine or the rewrite medium is not a legal apparatus. Namely, there is such an effect that illegal rewriting of the program data through a rewrite machine or a rewrite medium which is not legally supplied can be prevented.

According to the program rewrite system of the tenth invention, writing from the rewrite machine into the semiconductor memory is authorized only when writing and reading of prescribed data into and from the semiconductor memory are performed and these data coincide with each other, whereby there is such an effect that writing of the program into a faulty semiconductor memory can be prevented.

According to the program rewrite system of the eleventh invention, writing in the semiconductor memory is authorized or inhibited by transition of the memory control part among a plurality of operation modes. Therefore, such an effect can be attained that unexpected rewriting of the program can be prevented by properly setting conditions of transition.

According to the program rewrite system of the twelfth invention, the memory control part transits among the first to fourth operation modes, whereby there are such effects that illegal rewriting of the program data through a rewrite machine or a rewrite medium which is not legally supplied can be prevented while writing of the program into a faulty semiconductor memory can also be prevented.

BRIEF DESCRIPTION OF THE DRAWINGS

FIG. 10 presents diagrams showing examples of specifications of game cassettes.

BEST MODES FOR CARRYING OUT THE INVENTION

Figure 4:
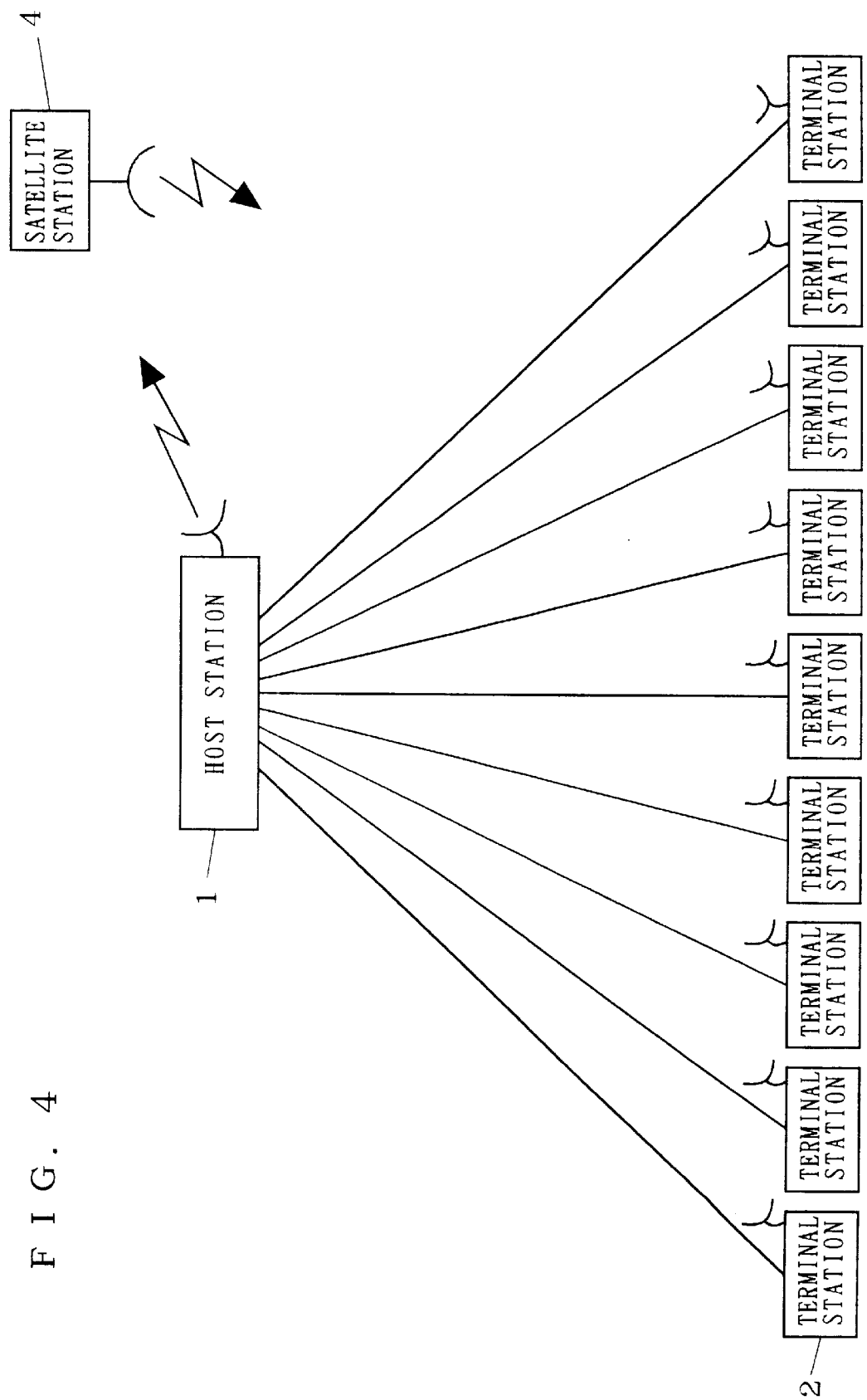
FIG. 4 is a diagram showing one mode of a communication network employed for the game program supply system according to the present invention.
Figure 5:
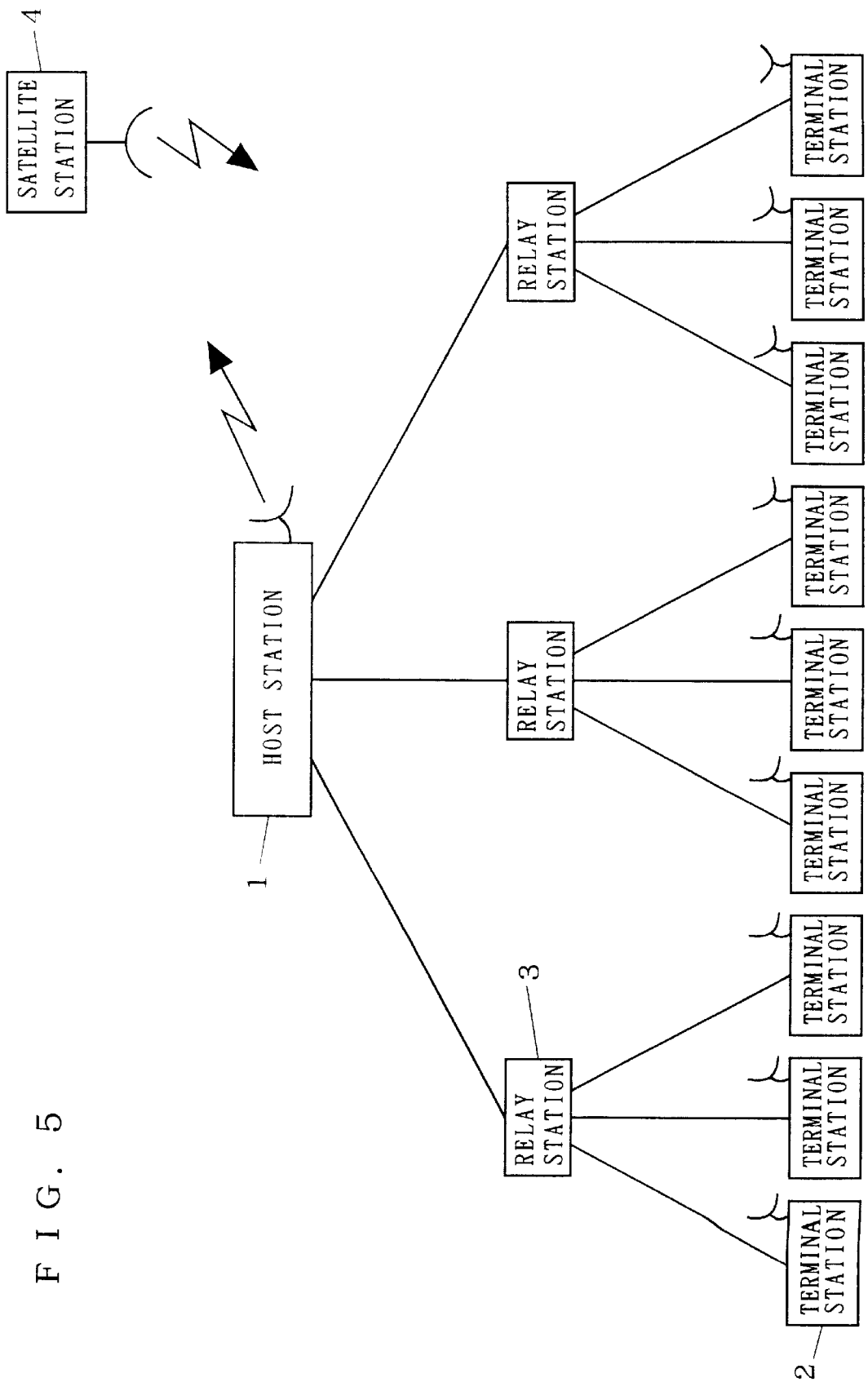
FIG. 5 is a diagram showing one mode of a communication network employed for the game program supply system according to the present invention.
Figure 6:
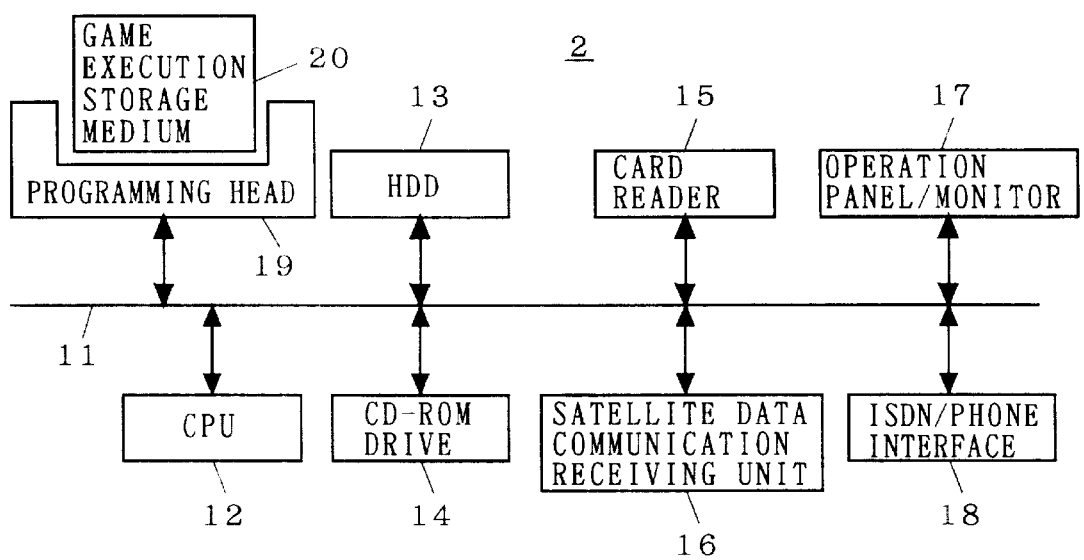
FIG. 6 is a block diagram showing a detailed structure of a terminal station.

FIG. 1 to FIG. 5 are diagrams showing five modes of communication networks employed for a game program supply system according to the present invention. FIG. 6 is a block diagram showing the detail of a terminal station.

In FIG. 1 to FIG. 5, a host station 1 becomes a supplier of data of a game program. A plurality of terminal stations 2 are connected with the host station 1 through the communication network, and supplied with the data of the game program from the host station 1 online through the communication network. The plurality of terminal stations are separately supplied with the game program data offline too.

Figure 1:
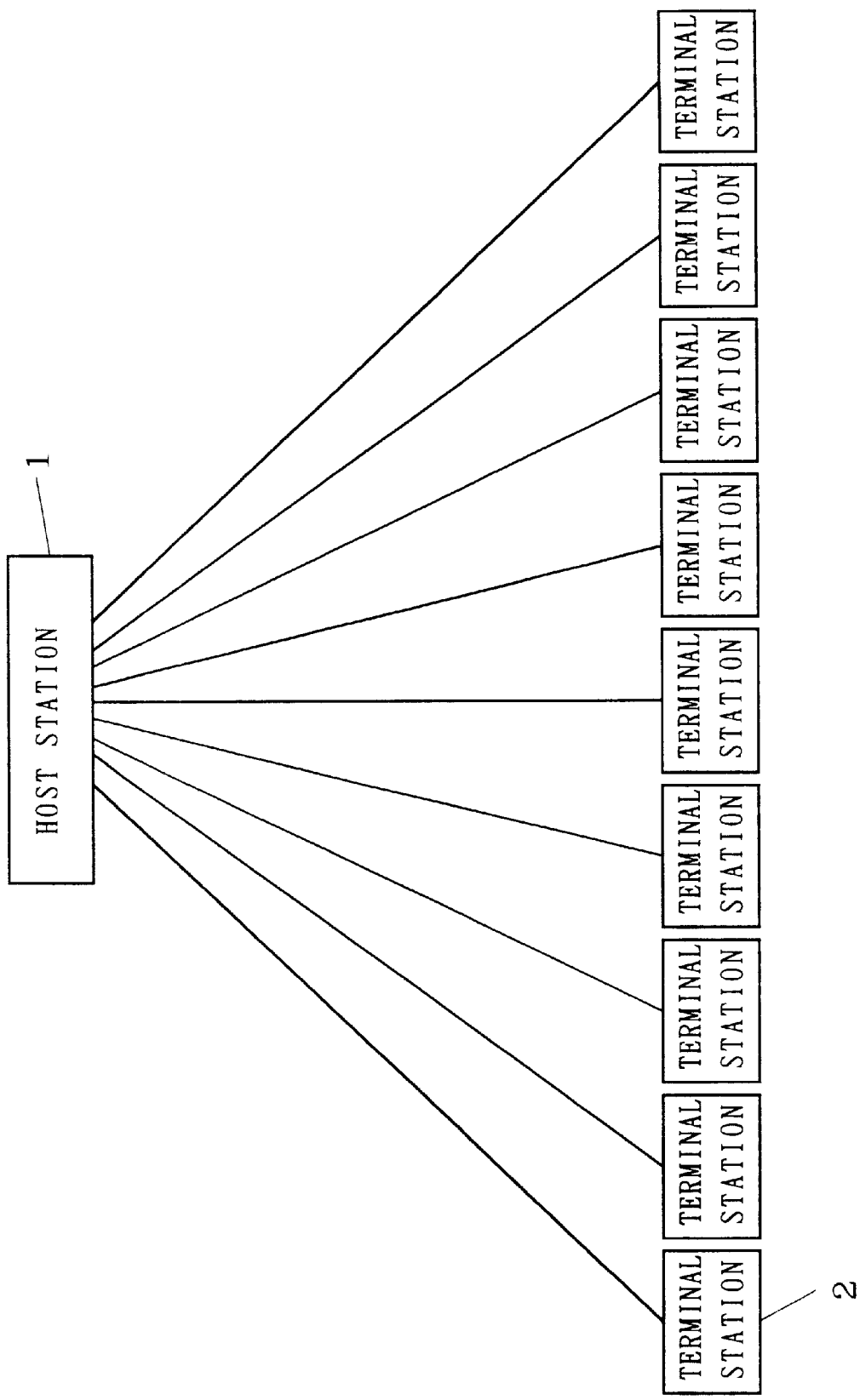
FIG. 1 is a diagram showing one mode of a communication network employed for a game program supply system according to the present invention.
Figure 2:
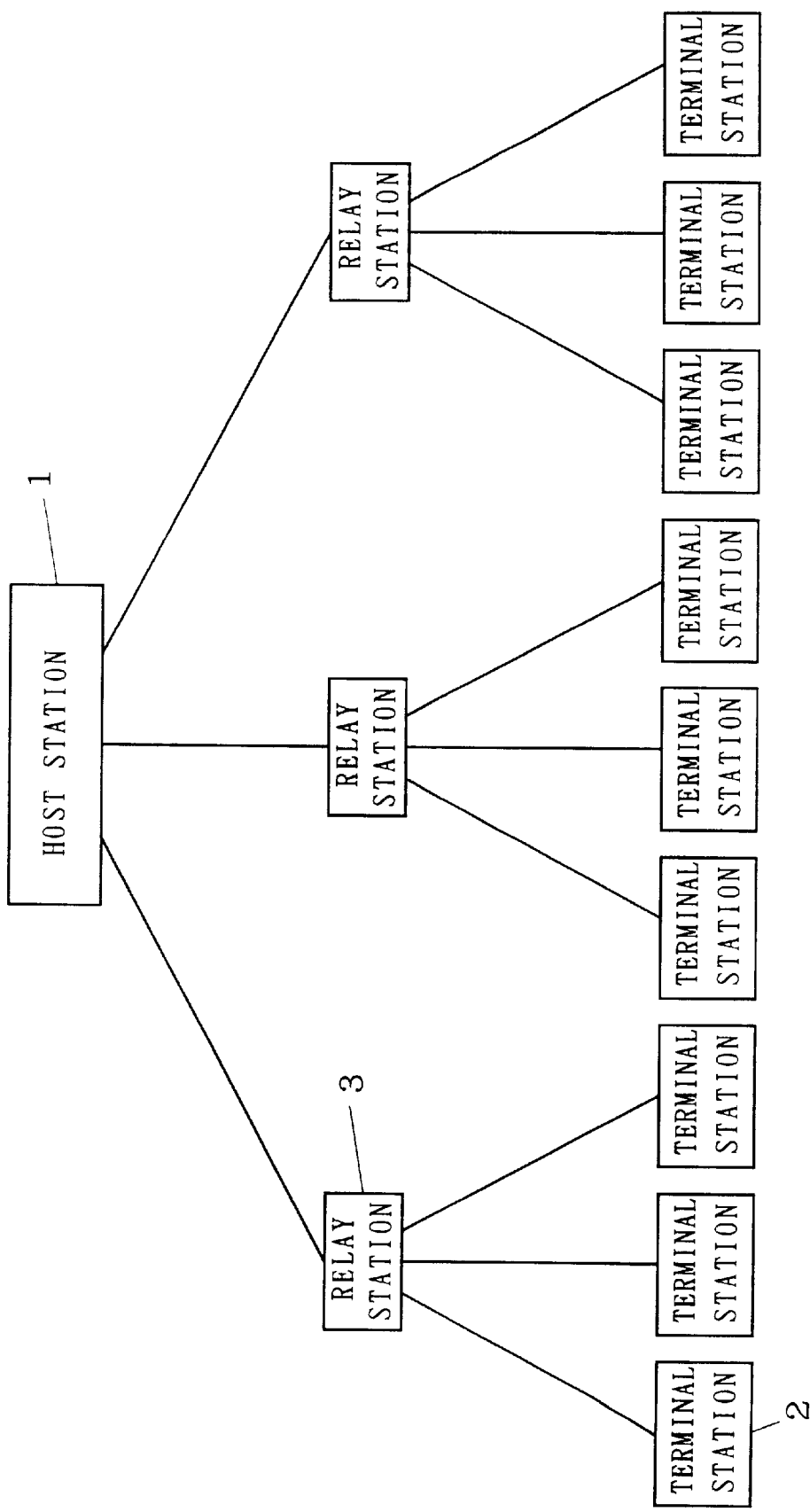
FIG. 2 is a diagram showing one mode of a communication network employed for the game program supply system according to the present invention.
Figure 3:
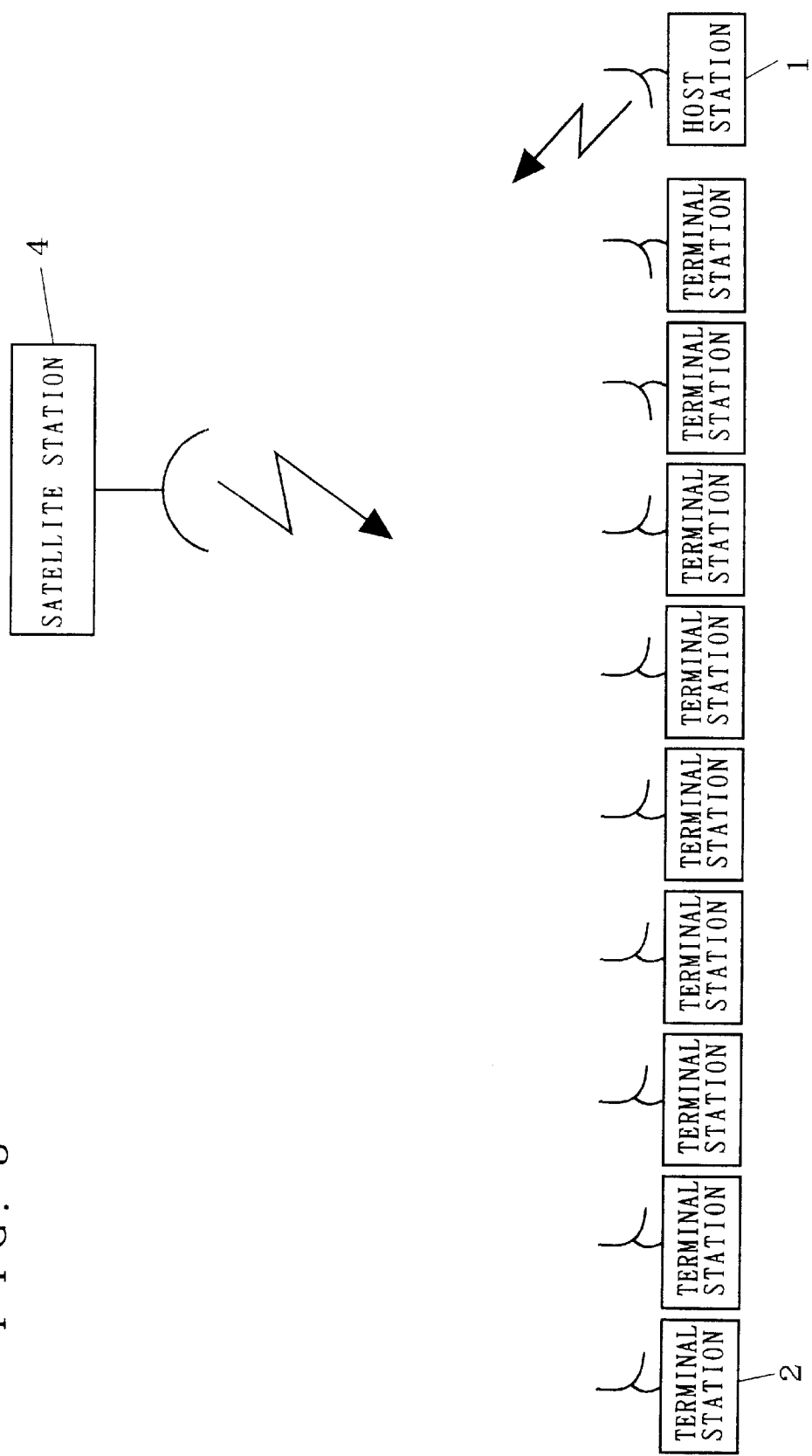
FIG. 3 is a diagram showing one mode of a communication network employed for the game program supply system according to the present invention.

The communication networks in FIG. 1 and FIG. 2 are ground communication networks such as ISDN lines or public telephone lines, FIG. 1 is a case placing no relay station, and FIG. 2 is a case placing relay stations 3 for load dispersion. The communication network of FIG. 3 is a satellite communication network such as a satellite data communication line, and comprises a satellite station 4 which is a communication satellite. The communication networks of FIG. 4 and FIG. 5 are combinations of ground communication networks and satellite communication networks, the communication network of FIG. 4 corresponds to that combining the communication networks of FIG. 1 and FIG. 3, and the communication network of FIG. 5 corresponds to that combining the communication networks of FIG. 2 and FIG. 3.

Referring to FIG. 6, each terminal station 2 comprises a hard disk drive (HDD) 13 including a hard disk unit serving as readable/writable first storage means preserving the data of the game program online-supplied from the host station 1 through the communication network. Further, each terminal station 2 comprises a CD-ROM drive 14 including a CD-ROM serving as read-only second storage means to be separately supplied with the data of the game program offline. These HDD 13 and CD-ROM drive 14 are connected with a CPU 12 managing control of all operations of the terminal station 2 through a bus 11. This bus 11, which is schematically expressed, is a concept including an external connection cable or the like in addition to an internal bus of a computer.

Further, each terminal station 2 comprises a card reader 15 for reading ID data etc. of each user from a member card issued for the user, an operation panel/monitor 17 employed when operating each terminal station 2, a satellite data communication receiving unit 16 employed for data receiving when the communication network is a satellite data communication network, an ISDN/Phone interface 18 employed for line connection when the communication network is an ISDN line or a public telephone line, and a programming head 19 for writing the data of the game program stored in the HDD 13 or the CD-ROM drive 14 into a game execution storage medium 20 which is a portable information storage medium applied to a game execution unit such as a game machine in response to a request of the user. These are also connected to the CPU 12 through the bus 11.

In operation, each terminal station 2 receives supply (download) of the data of the game program from the host station 1 through the communication network periodically or at any time. Since no download is made in response to a request from the terminal station 2, the host station 1 can operate in a time zone when the communication network is not congested, moreover every one line which is the minimum unit. The downloaded data are preserved in the HDD 13 in each terminal station 2. In this case, writing preservation (and desirably erase) with respect to the HDD 13 is entirely managed at the host station 1. Namely, each terminal 2 is regularly connected to the communication network and set in a receivable state, and writing preservation of the data is successively or simultaneously executed for each terminal station 2 (HDD 13) by performing writing preservation control on the host station 1 side. The contents of writing preservation control to be performed by the host station 1 may be identical for any terminal station 2, whereby there is such an advantage that the load of the host station 1 is not in the least influenced even if the number of terminal stations increases particularly when making simultaneous broadcast communication.

When the data quantity of the game program thus distributed online periodically or at any time reaches a considerable quantity, the data of the game program is separately distributed to each terminal station 2 offline with a CD-ROM. For example, a single CD-ROM can record mass data of about 300 game programs. The distributed CD-ROM is set in the CD-ROM drive 14 of each terminal station 2. Thus, overlapping storage data of the HDD 13 become unnecessary, and its storage area is used for storage of new data.

In online supply of the data of the game program, the host station 1 may encrypt and download the data for theft prevention. Key information for decrypting the cryptogram is separately supplied from the host station 1 to each terminal station 2 through the communication network. The key information can be periodically changed. Each terminal station 1 stores the key information in a memory (for example, the HDD 13 may be employed), and the CPU 12 decrypts the downloaded encrypted data of the game program when preserving the same into the HDD 13 on the basis of the stored key information, or preserves the encrypted data into the HDD 13 as such for performing decryption when reading the data.

Particularly in the communication network of FIG. 4 or FIG. 5, it is effective to distribute encrypted data of the game program through a satellite communication network and to provide the key information for decryption through a ground communication network. Due to employment of the satellite communication network, it readily becomes possible to make simultaneous broadcast communication of data of a game program having a large information quantity to a number of terminal stations 2 without making an unreceivable region. Assuming that the key information for decryption is also sent through the satellite communication system in this case, the meaning of encryption declines since the same is readily interceptable, while this point can be solved by sending only the key information through the ground communication network.

A user wanting a game program goes to the nearest termination station 2. An ID card of the user is loaded in the card reader 15 at the terminal station 2. The user information may be uploaded in the host station 1 through the communication network in real time or through batch processing.

The data of the game program required by the user is read from the HDD 13 or the CD-ROM drive 14, and written into the game execution storage medium 20 through the programming head 19. The game execution storage medium 20 can be that of a game cassette type utilizing a custom flash memory which is a kind of erasable rewritable ROM too, for example. Thus, a game execution storage medium which is excellent in physical strength and recyclably usable can be implemented. The user can enjoy the game by applying the game execution storage medium 20 in which the data of the desired game program are written to his game machine.

A communication network by radio waves other than the satellite communication network may be employed in place of the satellite communication network, and a similar effect can be attained also in this case.

Figure 7:
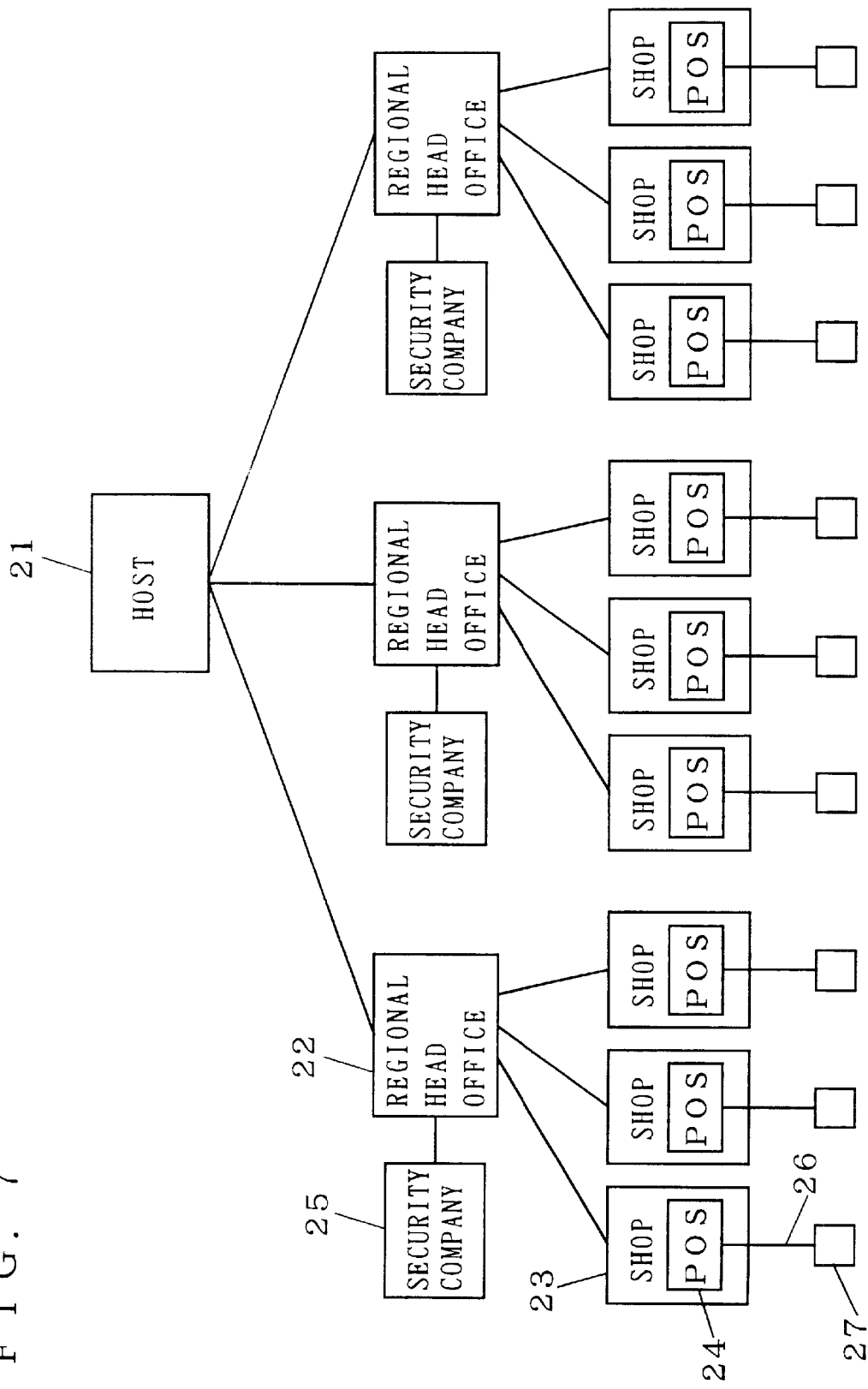
FIG. 7 is a diagram showing a communication network of a POS system employed for the game program supply system according to the present invention.

FIG. 7 is a diagram showing another mode of the communication network employed for the game program supply system according to the present invention. In this embodiment, a POS system is employed as the communication network, in practice, each terminal station 2 is often set in a retail shop into which a POS system for sales management is introduced. In such case, utilizing an existing POS system as the communication network for the game program supply system according to the present invention is this embodiment.

Referring to FIG. 7, a host station 21 supervising all object regions, regional head offices 22 provided for the respective regions and POS terminals 24 set in respective retail shops 23 are connected and constructed through a tree communication network having the regional head offices 22 as relay stations, for example, as is generally known. Namely, this is a mode similar to FIG. 2. In general, further, the communication network is connected also to security companies 25 for the respective regional head offices 22 for security management. The POS terminals 24 of the respective retail shops 23 are connected to game program data rewrite machines 27 through interface cables 26. The POS terminals 24 and the game program data rewrite machines 27 implement functions equivalent to those of the aforementioned terminal stations 2.

Figure 8:
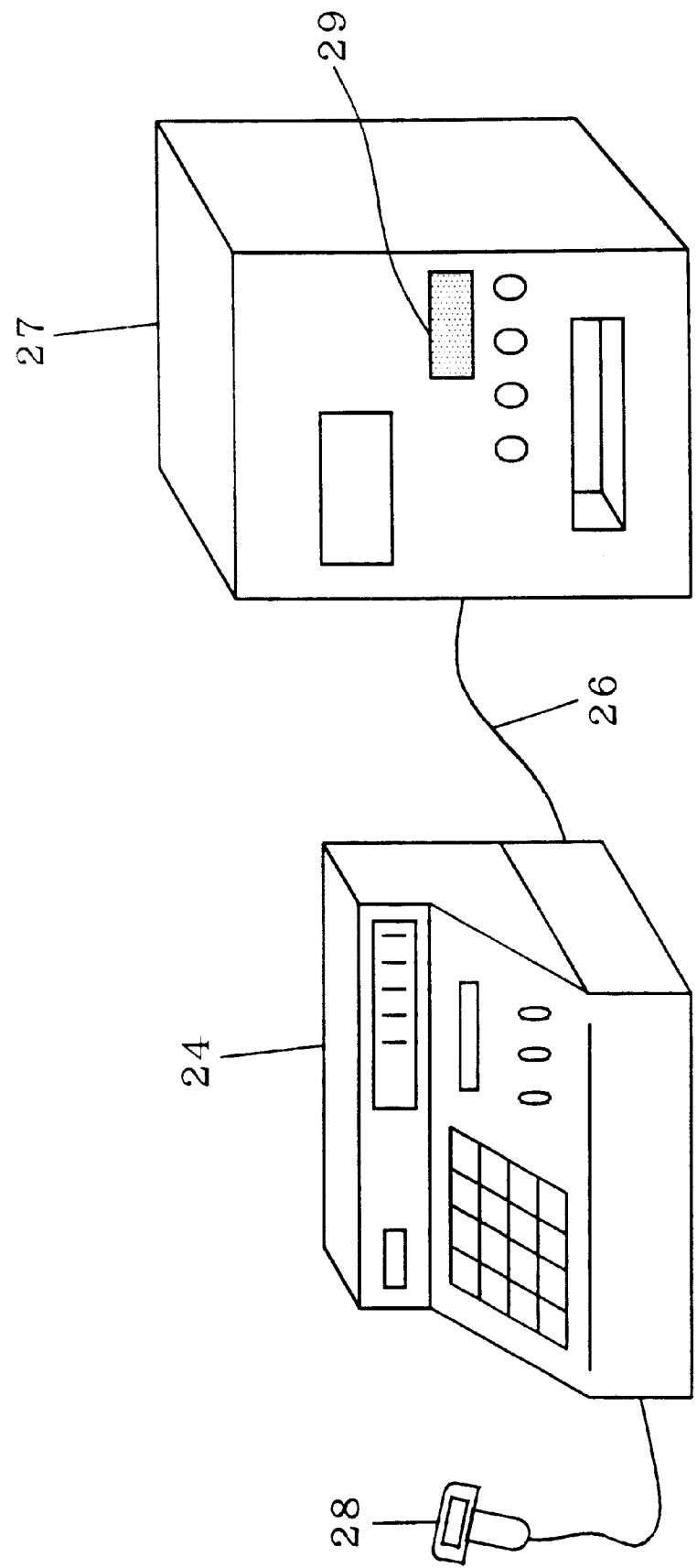
FIG. 8 is an appearance diagram showing a connection state between a POS terminal and a game program data rewrite machine.

FIG. 8 is an appearance diagram showing a state of connecting the POS terminal 24 and the game program data rewrite machine 27 with each other by the interface cable 26. A bar code reader 28 is comprised in the POS terminal 24, as is generally known. This bar code reader 28 can be employed in place as a part of the operation panel/monitor 17 of FIG. 6. The ISDN/Phone interface 18 is comprised in the POS terminal 24. The card reader 15 can be employed if comprised in the POS terminal 24, and if not, the same is provided in the game program data rewrite machine 27. The remaining elements of the terminal station 2 of FIG. 6 are provided in the game program data rewrite machine 27.

Number 29 in FIG. 8 denotes a mount connector of a game cassette which is the game execution storage medium, and adapted to set the game execution storage medium 20 to the programming head 19 of FIG. 6.

The data of the game program preserved in the game program data rewrite machine 27 may be those supplied from the host station 21 through the communication network of the POS system. Or, the same may be those distributed to the game program data rewrite machine 27 of each shop with a CD-ROM offline. Or, the same may be those combining these, as described above. Further, it is also possible to combine distribution by a separately provided satellite communication network. In this case, it becomes a mode just similar to FIG. 5.

According to this embodiment, there are the following advantages: Namely, security management can be readily implemented at a low cost, in the first place. In general, a security management system is already constructed in a POS system, and security management of the game program supply system according to the present invention can also be performed by simply adding small changes for adding the game program data rewrite machine 27 to management objects of this security management system. For example, it is readily possible to make the POS terminal 24 automatically inform the host station 21 when the connection between the POS terminal 24 and the game program data rewrite machine 27 is cut by a criminal or the like simply by adding some means to the security management system of an existing POS system without particularly requiring addition of a dedicated apparatus or the like.

There is also such an advantage that a manipulation method is simplified. Namely, the bar code reader 28 is generally comprised in the POS terminal 24, and this is utilized for manipulation of the game program data rewrite machine 27. For example, it is possible to select a specific game program by bar code reading through the bar code reader 28 by bar-coding a list of game programs preserved in the game program data rewrite machine 27. Further, it is also possible to bar-code various commands to be supplied to the game program data rewrite machine 27 in rewrite starting or the like for executing command supply by reading thereof. Thus, it becomes possible to simplify a manipulation apparatus of the game program data rewrite machine 27 by enabling partial or overall manipulation of the game program data rewrite machine 27 by control from the POS terminal 24 side. Further, a salesclerk is accustomed to manipulation of the bar code reader, and skill of the salesclerk who is a manipulator is early as to manipulation of the game program data rewrite machine 27. When the game program data rewrite machine 27 is set to be manipulated by bar code reading, further, it is impossible to correctly operate the same if there is no bar code reader 28 and the contents of bar codes are unknown granted that the game program data rewrite machine 27 is stolen, whereby this is useful also for crime prevention.

Further, there is also such an advantage that system construction can be performed at a low cost. Namely, connection means with the host computer 21 is comprised in the POS terminal 24 and there is no need to provide connection means with the host computer 21 in the game program data rewrite machine 27 in case of connecting the game program data rewrite machine 27 to the POS terminal 24 and employing the same, whereby it is possible to construct the system at a low cost.

While the case of connecting the game program data rewrite machine 27 to the POS terminal 24 and employing the same has been shown in the aforementioned embodiment, game program data rewrite machines 27 may be those comprising all functions of the terminal station 2 of FIG. 6 in the following various embodiments.

Figure 9:
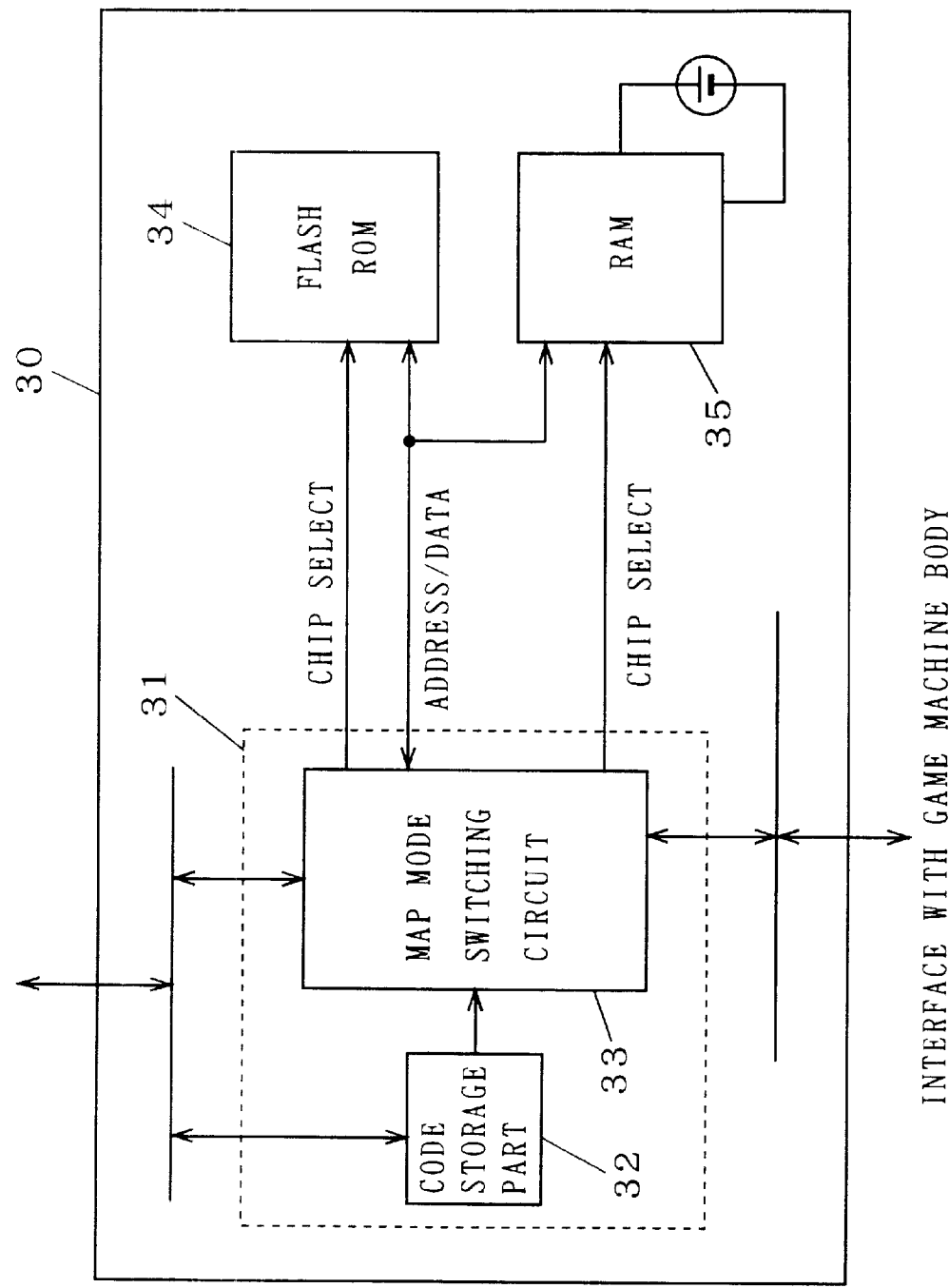
FIG. 9 is a block diagram showing an example of the internal structure of a game cassette employed in the present invention.

FIG. 9 is a block diagram showing an example of the structure of a cassette interior in case of employing a game cassette 30 containing a custom flash memory as the game execution storage medium which is the portable information storage medium utilized in the game program supply system according to the present invention. The game cassette 30 in this embodiment is structured to be capable of corresponding to game cassettes of existing various specifications. Here the specifications mean capacities of ROMs and RAMs carried on the game cassettes, and allocation (memory map) of the ROM capacities and RAM capacities with respect to total address spaces standardized as standards of game machines. It is the actual situation that existing game cassettes are implemented by various specifications in response to types of games.

FIG. 10 presents diagrams showing examples of specifications of game cassettes. (A) shows a memory map of a cassette specification 1, and (B) shows a memory map of a cassette specification 2. Total address spaces are prepared from addresses 0000H to FFFFH from banks 0 to banks 3. The cassette specification 1 has only relatively small ROM capacity and RAM capacity, and these are allocated to respective parts of the bank 0 and the bank 1 as shown in FIG. 10(A). On the other hand, the cassette specification 2 has relatively large ROM capacity and RAM capacity, and these are allocated employing almost all of the bank 0 to the bank 3 as shown in FIG. 10(B).

Here, assumed is a case of preparing the game cassette 30 employed in the present invention in the cassette specification 2 and writing a game program of the cassette specification 1 into this game cassette 30, for example. Data of the game program are associated with banks and addresses of an area of the ROM of the cassette specification 1, and also in case of storing the data in the game cassette 30 of the cassette specification 2, the same are stored in an area of the ROM of the cassette specification 2 implemented by a flash memory by the same banks and addresses. Assuming that the program created in the cassette specification 1 designates an address (e.g., 0000H of the bank 1) of the RAM when this game program is executed, no RAM is present in the address and it is inoperable in the cassette specification 2 storing the same now in practice. Cassettes having small capacities include that of such a specification that an addressing circuit is so structured as not to use the most significant bits of addresses but to make addressing with only the remaining bits. In this specification, an address 8000H and an address 0000H become the same addressing, for example, and it comes to that the same data are read from an existing memory address even if no memory exists in one side (the address 000H of the bank 0 in the cassette specification 1, for example) (the so-called image). When a game program of a cassette of this image specification is stored in the game cassette 30 according to the present invention having a general specification and operated, the address 8000H and the address 000H, for example, become different addressing as a matter of course, and hence the aforementioned image operation cannot be performed.

It is the actual situation that various ones are present in specifications of existing game cassettes, and hence in whatever specification the game cassette 30 employed in the present invention is structured, the game program supply system according to the present invention cannot be rendered correspondable to game cassettes of all specifications unless the same is rendered capable of attaining compatibility between the specifications.

In the game cassette 30 according to the present invention of FIG. 9, a cassette specification selecting circuit 31 is provided for attaining compatibility between specifications. The cassette specification selecting circuit 31 is formed by a code storage part 32 storing codes for specifying specifications, and a map mode switching circuit 33 changing what address of which memory is accessed (i.e., equal to making rereading of a memory map) in response to the difference between the specifications. A flash ROM 34 is provided in order to rewritably store data of game programs, and a RAM 35 is provided similarly to the conventional game cassette. The flash ROM 34 and the RAM 35 are allocated to the memory map of the banks 0 to 3 and the addresses 0000H to FFFFH in a prescribed specification. The code storage part 32 may be implemented on the same flash memory as the flash ROM 34, or another flash memory may be employed.

The map mode switching circuit 33 performs address rereading necessary for attaining compatibility between the specification (memory map) of the game cassette 30 employed in the present invention and specifications (memory maps) of existing various game cassettes. With reference to the aforementioned example (preparing the game cassette 30 employed in the present invention in the cassette specification 2, and writing the game program of the cassette specification 1 into this game cassette 30), an address of the RAM of the cassette specification 1 is converted to an address of the RAM (either the RAM of the bank 2 or the RAM of the bank 3 is employable) by action of the map mode switching circuit 33 for accessing the RAM 35. In case of the image specification, a memory address of a part where no memory corresponding to an image really exists is converted to a memory address of a part where a memory corresponding thereto really exists by action of the map mode switching circuit 33 for accessing the flash ROM 34 or the RAM 35.

Contents are determined in the specifications of existing various game cassettes, and hence a reread rule of memory addresses to be implemented by the map mode switching circuit 33 for normally operating is determined due to determination of the content of the specification of the game cassette 30 employed in the present invention. This reread rule can be readily implemented by a look-up table memory associating memory addresses of one specification with memory addresses of another specification. However, this look-up table memory must be provided for each of specifications of existing various game cassettes. Which look-up table memory is employed is decided by code information stored in the code storage part 32.

In operation, data of a desired game program are written in the flash ROM 34 by mounting the game cassette 30 on the game program data rewrite machine 27. Further, code information corresponding to the specification of the game program is written in the code storage part 32. In case of mounting the game cassette 30 onto the game machine body and executing the game, the map mode switching circuit 33 inputs the code information in the code storage part 32 and activates the corresponding look-up table at the time of power supply, for example. Signal transfer between the game machine body and the flash ROM 34 or the RAM 35 is performed under address change by the look-up table, whereby it is possible to normally execute the game regardless of the specification of the game cassette 30 and the specification of the game program stored therein.

It is also possible to structure the map mode switching circuit 33 by rewritable programmable logic such as GAL or FPGA etc. Thus, even if cassettes of new types are formed and the specifications increase in the future, expansion of the corresponding range of the map mode switching circuit 33 can be readily performed by rewriting the contents of the logic to be correspondable thereto. For example, it is possible to readily detach and rewrite the contents of the logic by employing a GAL chip and arranging the chip in the map mode switching circuit 33 through an IC socket. Further, it is possible to structure the map mode switching circuit 33 by simultaneous employment of the look-up table and the rewritable programmable logic.

Figure 11:
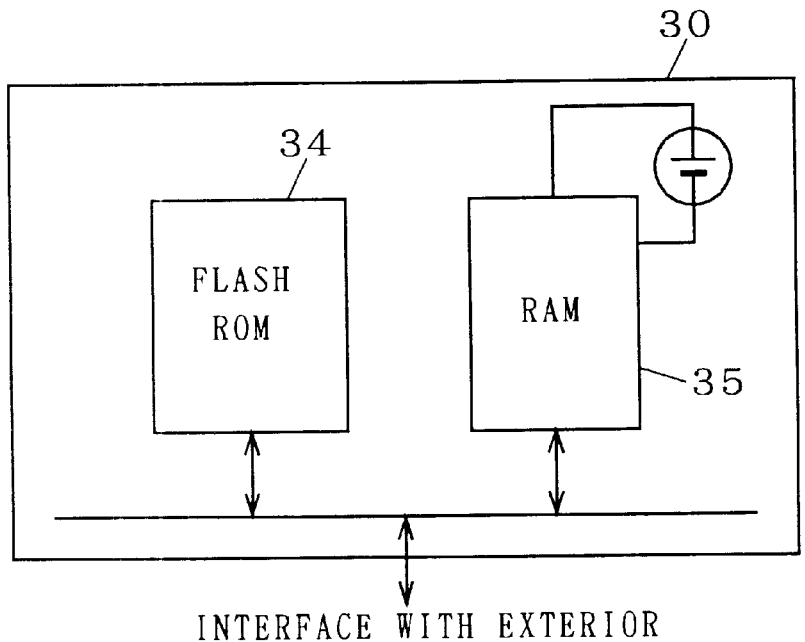
FIG. 11 is a block diagram showing an example of the internal structure of a game cassette employed in the present invention.

FIG. 11 is a block diagram showing the simplest structure of the cassette interior in case of employing a game cassette 30 containing a custom flash memory as the game execution storage medium which is the portable information storage medium utilized in the game program supply system according to the present invention. In this embodiment, the cassette specification selecting circuit 31 of FIG. 9 is not provided between a flash ROM 34, a RAM 35 and the exterior but an interface with the exterior is set at only one portion. Namely, signal transfer with a game machine body and a game program data rewrite machine is performed through this external interface of one portion.

Figure 13:
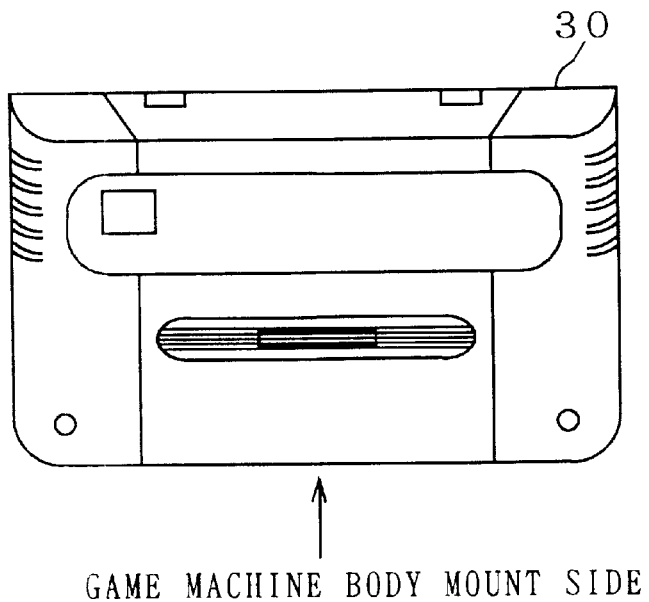
FIG. 13 is an appearance diagram of the game cassette.

FIG. 13 is an appearance diagram of the game cassette. As is known in general, the bottom surface of the game cassette 30 is the game machine body mount side, and a connector (not shown) for connecting the same with the game machine body is provided there. In this embodiment, it is possible to simply structure the game cassette 30 by employing this connector also for connection with the game program data rewrite machine. In order to execute rewriting by the game program data rewrite machine 27, however, control signals are insufficient with signals with the game machine body heretofore employed, and hence it is necessary to employ a game machine connection connector of a new specification in place of a game machine connection connector generally employed in general. Or, in case of employing a game machine connection connector of a general specification, it is necessary to add change for performing insufficient signal addition for the game program data rewrite machine 27 to the connector periphery. In order to mount the game cassette 30 structured as such on an existing game machine body manufactured by a conventional general connector specification in either case, it is necessary to separately prepare a mount adaptor for mounting the same through the adaptor.

Figure 12:
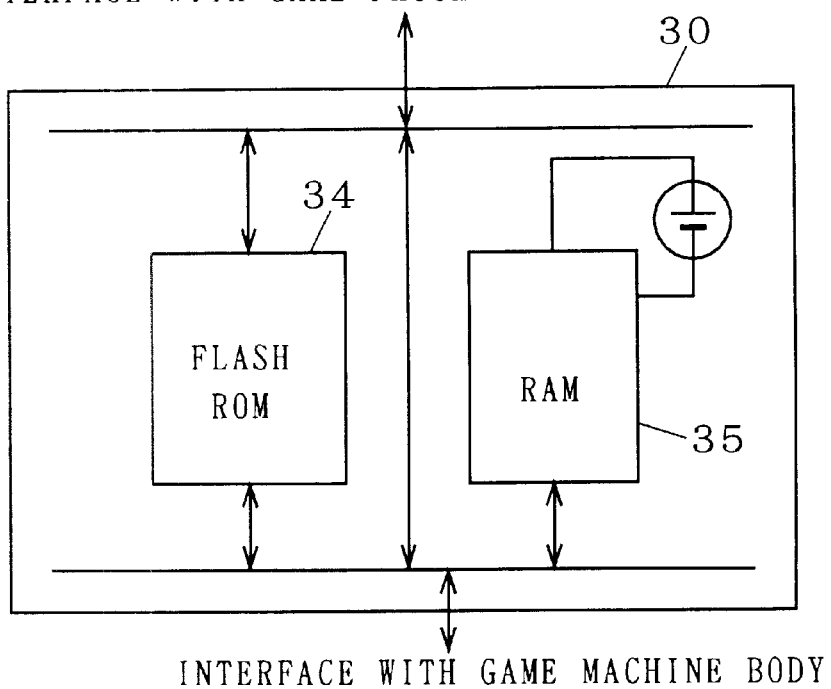
FIG. 12 is a block diagram showing an example of the internal structure of a game cassette employed in the present invention.

FIG. 12 is a block diagram showing the internal structure of a game cassette 30 making such a mount adaptor unnecessary. In this embodiment, interfaces with the exterior are provided in two portions in the embodiment of FIG. 11. Namely, the interface with the game machine body and an interface with the game program data rewriter are provided independently of each other, for performing signal transfer with the game machine body and the game program data rewrite machine through the respective ones of these.

Figure 14:
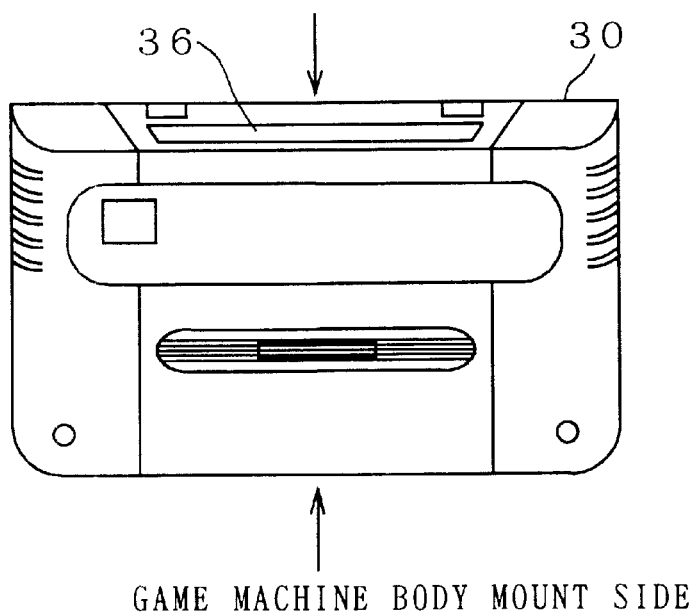
FIG. 14 is an appearance diagram of a game cassette.

FIG. 14 is an appearance diagram showing an example of a structure of a game cassette 30 in case of providing interfaces with the exterior in two portions. On the bottom surface of the cassette 30 which is a general game machine body mount side, a game machine connection connector (not shown) of a general specification is provided in general. On the opposite surface of this bottom surface, i.e., on the upper surface of the cassette 30, on the other hand, a connector part for game program data rewrite machine connection is provided, and this connector part is closed with an openable/closable lid 36. The lid 36 performs a role of closing the cassette upper surface upwardly directed when the game cassette 30 is mounted on a game machine body for preventing entrance of dust in the connector part for game program data rewrite machine connection.

Figure 15:
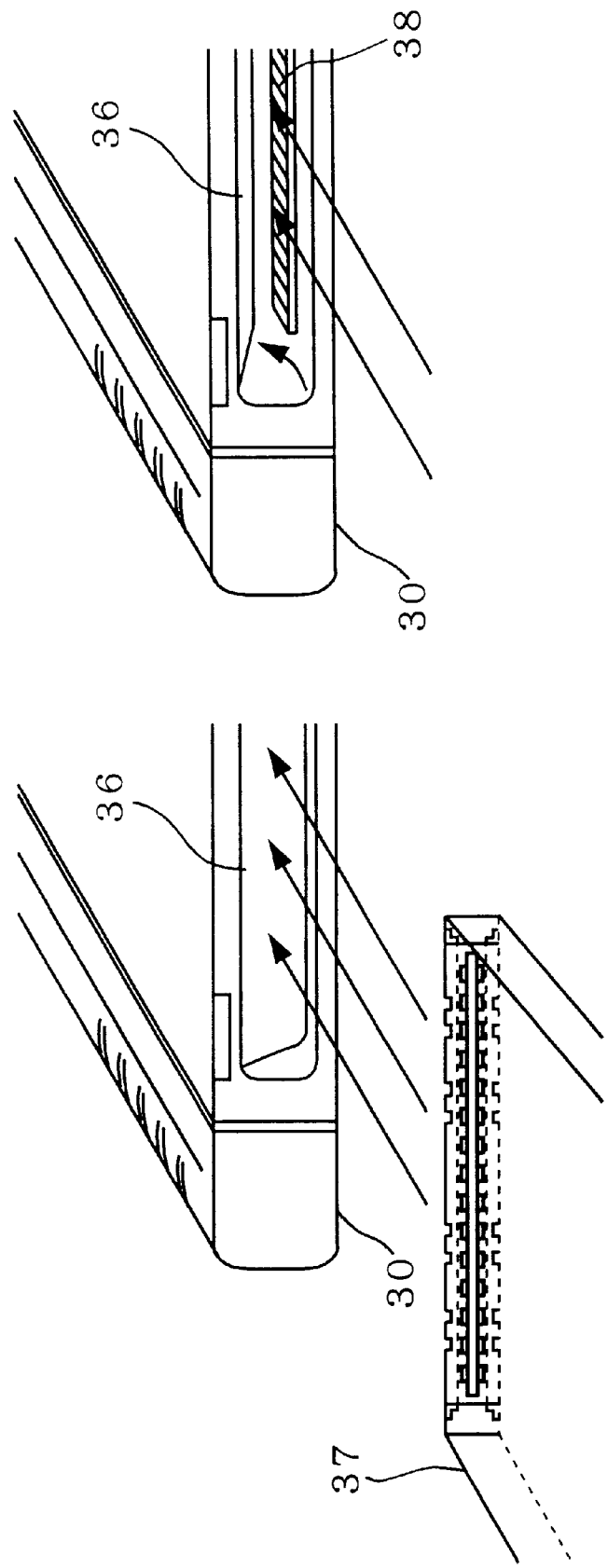
FIG. 15 is an explanatory diagram showing a state at a time of mounting the game cassette on a game program data rewrite machine.

FIG. 15 is an explanatory diagram showing a state at a time of mounting the game cassette 30 on a connector part 29 of a game program data rewrite machine 27. Number 37 is a connector receiver provided in the connector part 29 of the rewrite machine 27, and the connector receiver 37 waiting in the connector part 29 pushes the lid 36 open by inserting the game cassette 30 in the connector part 29 of the rewrite machine 27, to engage and be electrically connected with the connector 38 of the game cassette 30.

The connector part for game program data rewrite machine connection provided on the game cassette 30 may not necessarily provided on the upper surface of the game cassette 30. It may be provided on any surface of the game cassette 30, so far as the position does not physically interferes when the game cassette 30 is mounted on a game machine body of a general structure.

According to this embodiment, it becomes possible to directly mount the game cassette 30 on the existing game machine body without mounting the same through an additional adaptor when mounting the same on the game machine body, and it becomes possible to construct a game program supply system employing a rewritable game cassette without requiring additional component purchase to the user. Further, it becomes possible to structure the system with no limitation by the hardware structure of the existing game machine body by dedicatedly providing the connector for game program data rewrite machine connection on the game cassette 30.

Figure 16:
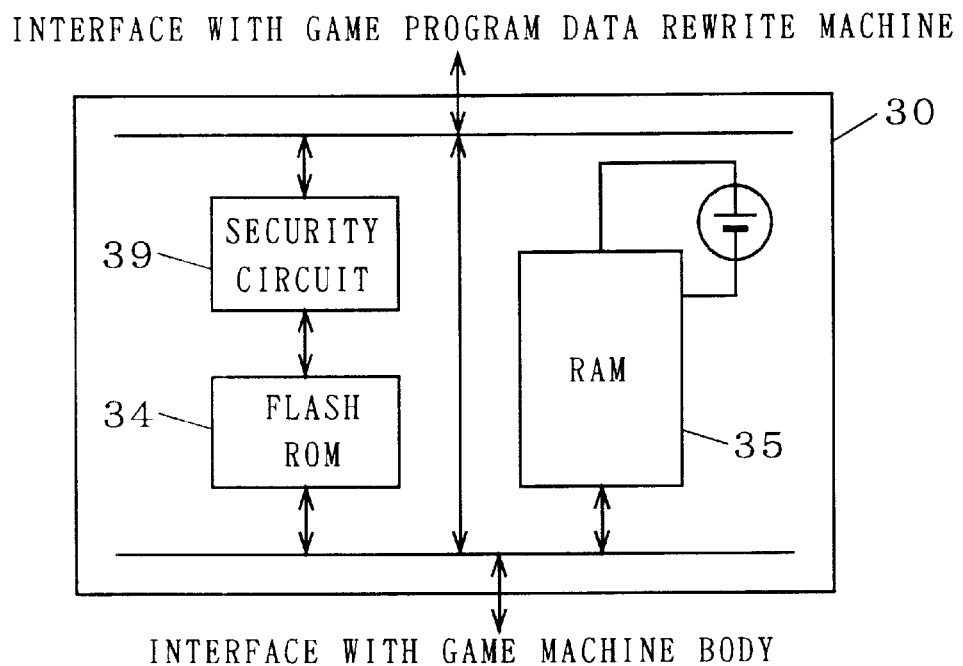
FIG. 16 is a block diagram showing an example of the internal structure of a game cassette employed in the present invention.

FIG. 16 is a block diagram showing an exemplary structure of the cassette interior in case of providing an illegal game program rewrite preventing function on the game cassette 30. In this embodiment, a security circuit 39 is provided between the flash ROM 34 and the game program data rewrite machine interface in the embodiment of FIG. 12.

Figure 17:
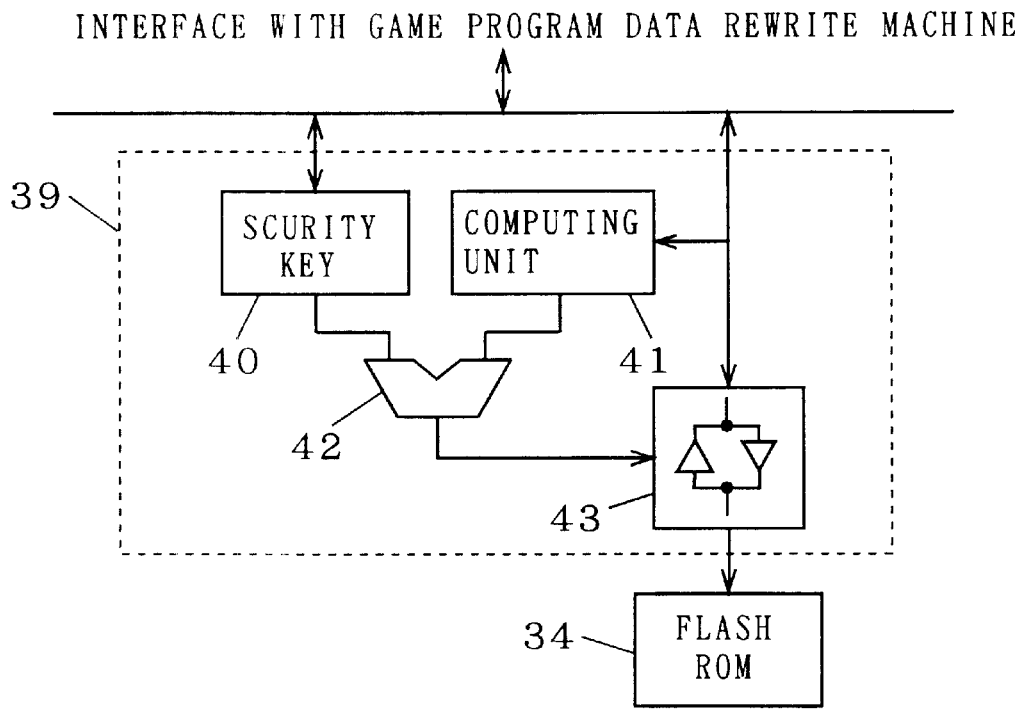
FIG. 17 is a block diagram showing a structural example of a security circuit.

FIG. 17 is a block diagram showing an exemplary structure of the security circuit 39. In advance of supply of the game program data to be rewritten when rewriting the data of the flash ROM 34 by a game program data rewrite machine 27, a security key value corresponding to the game program data is supplied from the game program data rewrite machine 27, and this key value is stored in a security key storage part 40. The key value is previously set as a value specific to each game program data, and stored in association with each game program data in the game program rewrite machine 27. The corresponding security key value is distributed online simultaneously with the game program data when distributing the game program data to the game program data rewrite machine 27 online, for example, and when distributing the game program data to the game program data rewrite machine 27 offline with a CD-ROM, the security key value is written in the CD-ROM in association with each game program data.

A computing unit 41 receives the game program data to be rewritten supplied from the game program data rewrite machine following the security key value, and performs a prescribed operation on the data. The operation content is previously determined, and the computing unit 41 is formed as a logic circuit executing the operation, for example. An operation result of the computing unit 41 is supplied to a comparator 42. Further, the key value of the security key storage part 40 is supplied to the comparator 42. The comparator 42 compares these data with each other, and outputs a control signal turning on a gate 43 only when the same coincide with each other. If the value operated from the supplied game program data and the previously stored security key value do not coincide with each other, therefore, the gate 43 goes off, and no writing of following game program data in the flash ROM 34 is performed. Checking by a check sum value or CLC can be employed.

According to this embodiment, writing from those other than the game program data rewrite machine holding correct security key values can be inhibited, whereby rewriting of the game program of the game cassette 30 is impossible unless game program data normally distributed online or distributed with a CD-ROM offline is employed as a rewrite source even if there is a game program data rewrite machine, and there is such an advantage that illegal rewriting of the game program of the rewritable game cassette 30 can be prevented.

Figure 18:
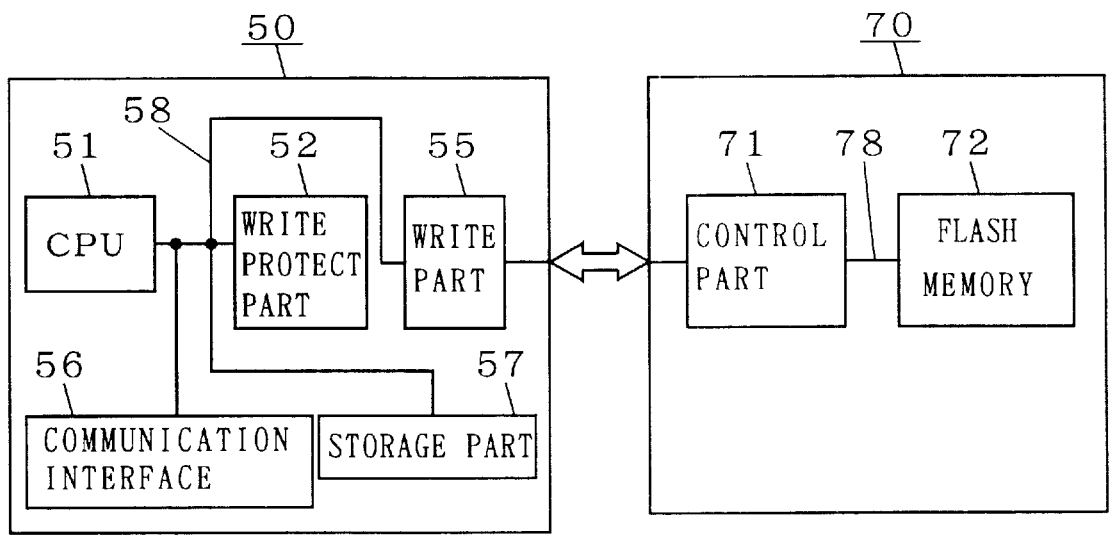
FIG. 18 is a block diagram showing other examples of the rewrite machine and the game cassette.

FIG. 18 is a block diagram showing other exemplary structures of a rewrite machine having a game program data illegal rewrite preventing function and a game cassette. A rewrite machine 50 and a game cassette 70 of this embodiment are so structured that writing of data of a program is performed after confirming that both of these are normal apparatuses, i.e., the same are not illegally supplied apparatuses. Further, a test is executed also as to whether or not there is hardware failure in a flash memory 72 before writing of the data of the program is performed.

A write protect part 52, a write part 55, a communication interface 56 and a storage part 57 are comprised in the rewrite machine 50, in addition to a CPU 51. These apparatus parts couple with each other through a bus line 58. Among these, the write part 55 is an apparatus part transferring signals between the same and the game cassette 70, and structured as the programming head 19 of FIG. 6, for example. The communication interface 56 is an interface with a communication line supplying the data of the program, and structured as the ISDN/Phone interface 18 of FIG. 6, for example. Further, the storage part 57 is a storage medium storing the data of the program, and structured as the HDD 13 of FIG. 6, for example.

The flash memory (flash ROM) 72 is comprised in the game cassette 70 as a memory for writing the data of the game program, similarly to the game cassette 30 of FIG. 9. In the game cassette 70, a control part 71 is further comprised. These apparatus parts couple with each other through a bus line 78.

The write protect part 52 provided on the side of the rewrite machine 50 and the control part 71 provided on the side of the game cassette 70 serve a function of preventing illegal writing of the program in cooperation with each other. Namely, in this embodiment, the point that the write protect part 52 is comprised in the rewrite machine 50 and the control part 71 is comprised in the game cassette 70 is characteristically different from the rewrite machines 27 and the game cassettes 30 of the remaining embodiments. The write protect part 52 and the control part 71 are structured by ASIC (custom LSI).

Figure 19:
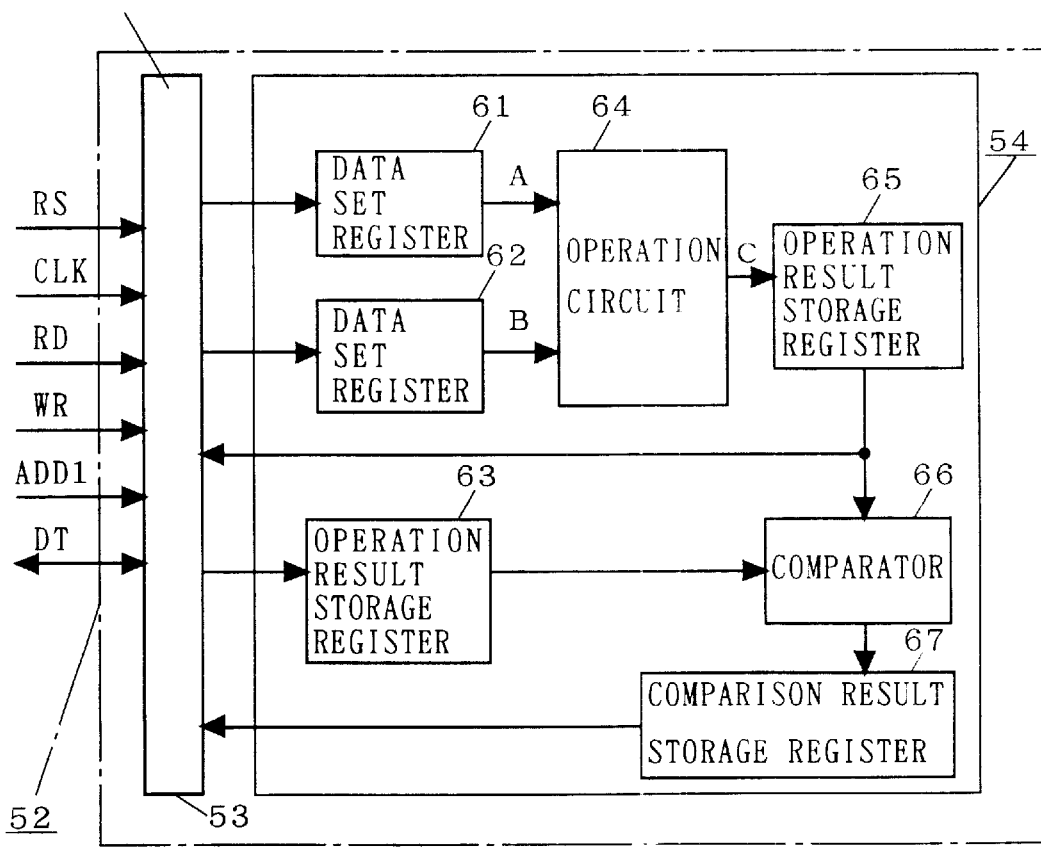
FIG. 19 is a block diagram of a write protect part of FIG. 18.

FIG. 19 is a block diagram showing the internal structure of the write protect part 52 forming a characteristic part of the rewrite machine 50. An interface 53 and a write protect control part 54 are comprised in the write protect part 52. The interface 53 is an interface intervening between the CPU 51 and the write protect control part 54.

A reset signal RS, a system clock signal CLK, a read enable signal RD, a write enable signal WR, an address signal ADR1, and a data signal DT are inputted from the CPU 51 into the interface 53. The data signal DT employs a data bus as a transmission medium, and is bidirectionally transferred between the CPU 51 and the write protect control part 54. The address signal ASDR1 employs an address bus as a transmission medium.

Two registers 61 and 62 for data setting, an operation circuit 64, two registers 63 and 65 for storing operation results, a comparator 66, and a register 67 for comparison result storage are comprised in the write protect control part 54.

Figure 20:
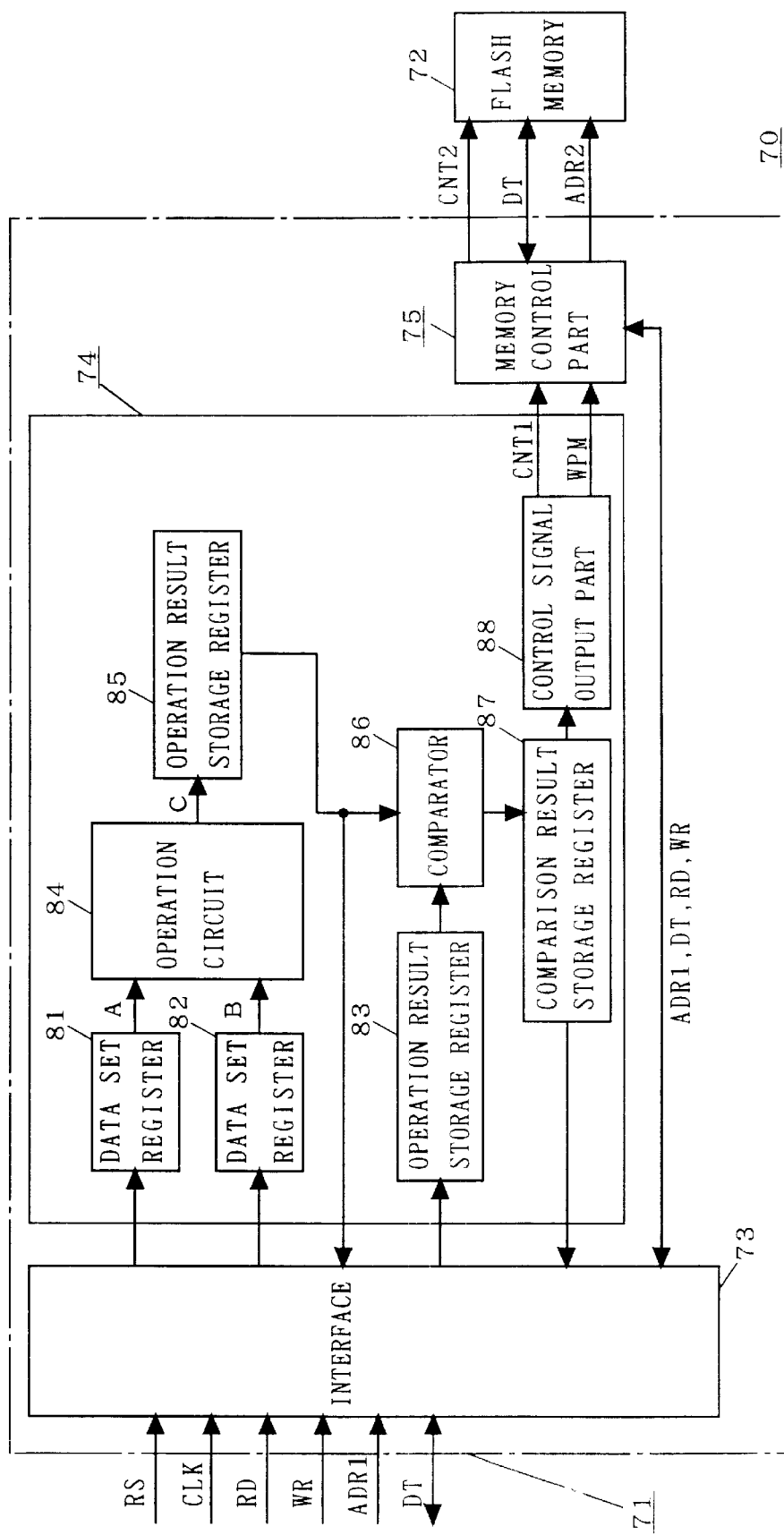
FIG. 20 is a block diagram of a control part of FIG. 18.

FIG. 20 is a block diagram showing the internal structure of the control part 71 forming a characteristic part of the game cassette 70. An interface 73, a write protect control part 74, and a memory control part 75 are comprised in the control part 71. The interface 73 is an interface intervening between the CPU 51 comprised in the rewrite machine 50 and the write protect control part 74 comprised in the interior of the control part 71. Between the CPU 51 and the interface 73, the data signal DT and other signals are transferred similarly to those between the CPU 51 and the interface 53.

The write protect control part 74 is an apparatus part playing a central role in prevention of illegal writing. Its principal part is structured similarly to the write protect control part 54. Namely, two registers 81 and 82 for data setting, an operation circuit 84, two registers 83 and 85 for operation result storage, a comparator 86, and a register 87 for comparison result storage are comprised in the write protect control part 74.

A control signal output part 88 is further comprised in the write protect control part 74. The control signal output part 88 outputs an internal flash control signal CNT1 and a write authorization signal WPM to the memory control part 75. The write authorization signal WPM is a signal supplying an instruction indicating that writing in the flash memory 72 is to be authorized, and the internal flash control signal CNT1 is an instruction code instructing starting of a test of the flash memory 72 or the like, for example.

The memory control part 75 is an apparatus part controlling a write operation and a read operation of the flash memory 72 on the basis of the signals from the write protect control part 74 and the CPU 51. Although illustration is omitted, an address decoder decoding the address signal ADR1 and outputting the same as a flash address signal ADR2 specifying an address of the flash memory 72 is comprised in the memory control part 75. Further, a memory map forming part for creating a memory map responsive to the specification of the cassette is comprised in the memory control part 75. This memory map forming part is structured as the cassette specification selecting circuit 31 of FIG. 9, for example.

From the memory control part 75 in the flash memory 72, a flash control signal CNT2 is inputted in addition to the data signal DT and the flash address signal ADR2. The flash control signal CNT2 is a signal instructing the write operation and the read operation of the flash memory 72. The data signal DT is bidirectionally transferred between the memory control part 75 and the flash memory 72.

Figure 21:
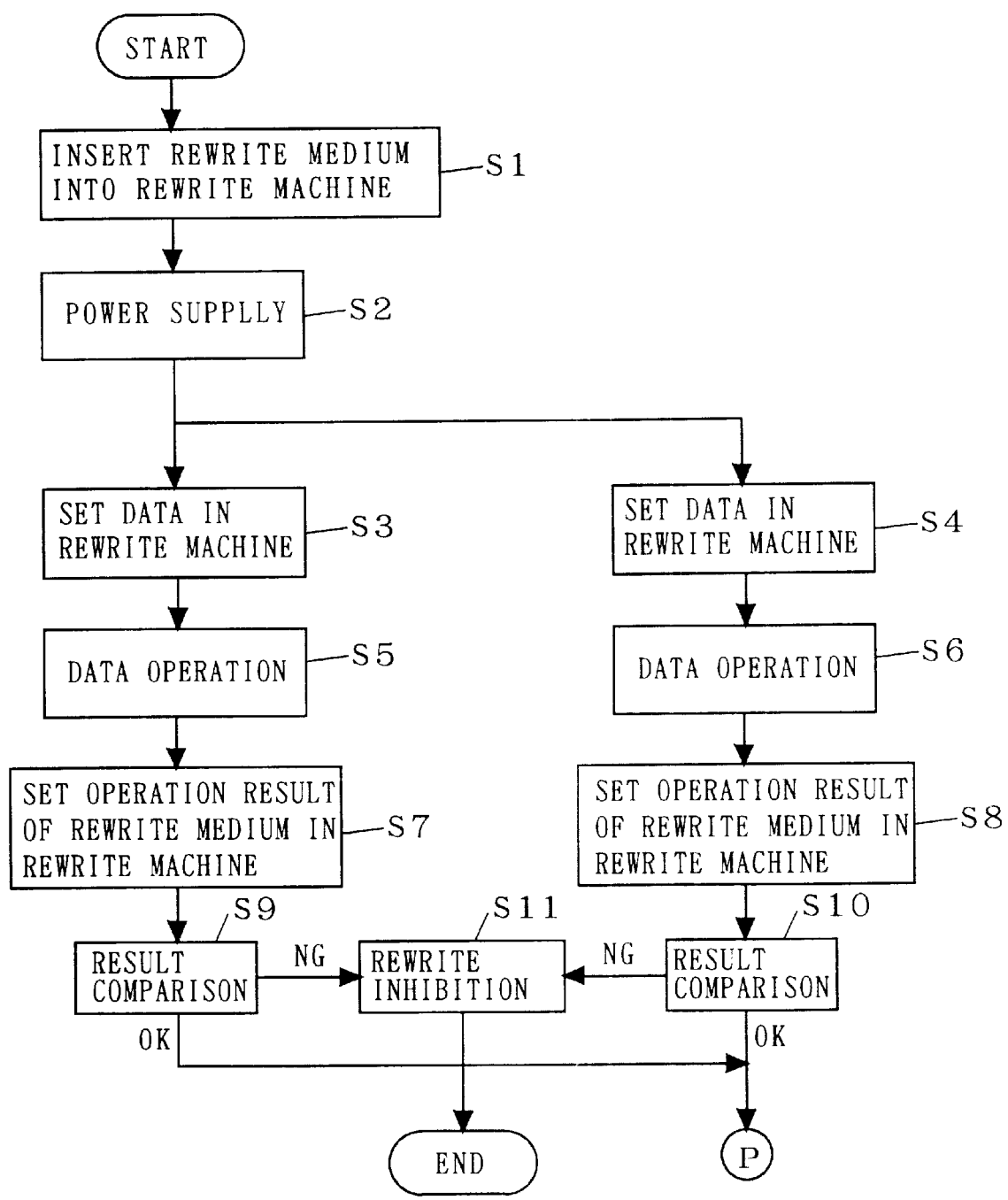
FIG. 21 is a flow chart showing a flow of an operation of the system of FIG. 18.
Figure 22:
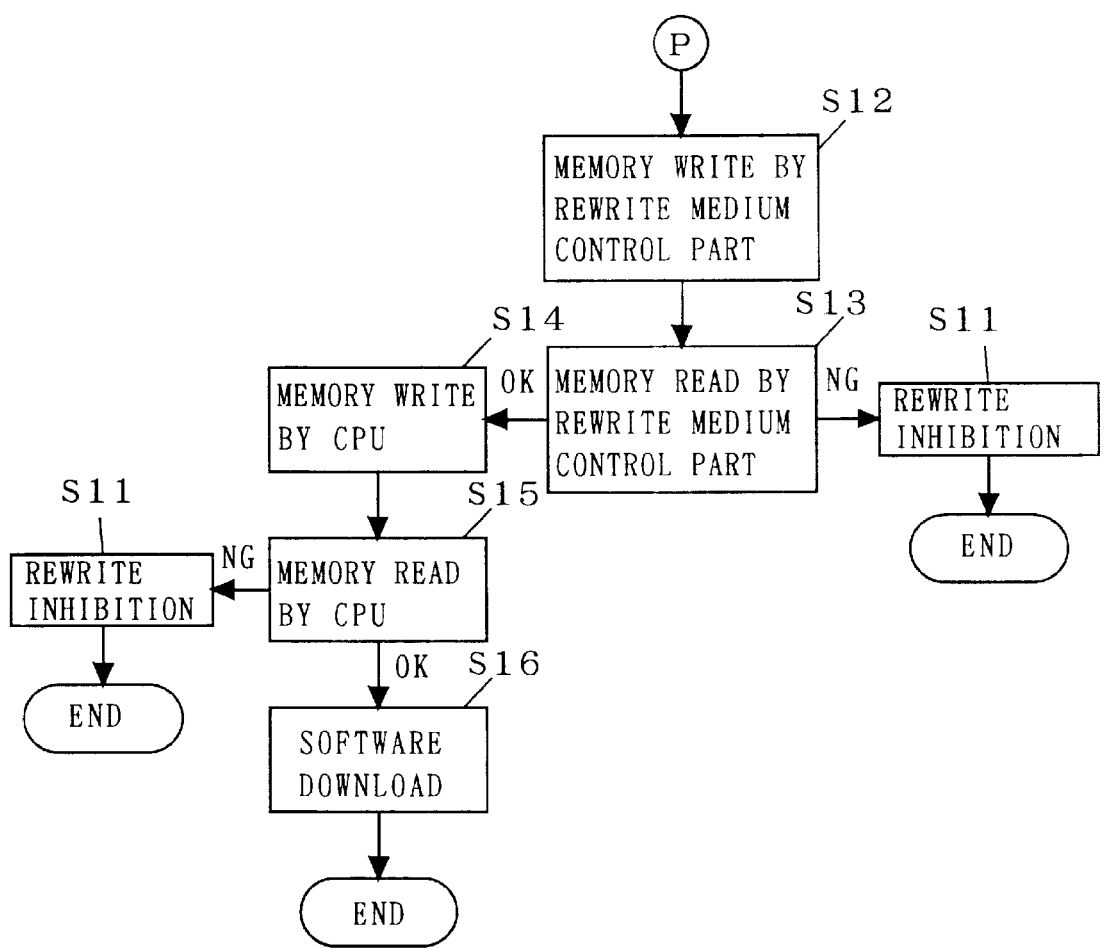
FIG. 22 is a flow chart showing the flow of the operation of the system of FIG. 18.

FIG. 21 and FIG. 22 are flow charts showing a flow of an operation in the overall combined body of the rewrite machine 50 and the game cassette 70 in case of connecting the game cassette 70 to the rewrite machine 50 and writing the data of the program in the flash memory 72 of the game cassette 70. Along these flow charts, operations of the respective parts of the rewrite machine 50 and the game cassette 70 are described in detail below.

When processing is started, the rewrite medium, i.e., the game cassette 70 is first inserted into the rewrite machine 50 at a step S1. Consequently, the rewrite machine 50 and the game cassette 70 are connected with each other.

Then, power for the rewrite machine 50 is supplied at a step S2. Then, the memory control part 75 executes creation of a memory map. Thereafter the processing shifts to steps S3 and S4.

At the step S3, the CPU 51 writes data of one byte in each of the registers 61 and 62. Simultaneously with or around this, the CPU 51 writes the data of one byte identical to the data written in the registers 61 and 62 in each of the registers 81 and 82 at the step S4. Consequently, the register 61 and the register 81 hold the same data of one byte, and the register 62 and the register 82 hold the same data of one byte.

Then, at a step S5, the operation circuit 64 executes an operation on the basis of the data of the registers 61 and 62, and writes data of an operation result in the register 65. Simultaneously at a step S6, the operation circuit 84 executes an operation on the basis of the data of the registers 81 and 82, and writes data of an operation result in the register 85. When both of the rewrite machine 50 and the game cassette 70 are normal apparatuses, the operation circuit 64 and the operation circuit 84 are formed identically to each other. At this time, operations identical to each other are executed in both operation circuits 64 and 84, whereby the data written in the two registers 65 and 85 also become identical to each other.

Figure 23:
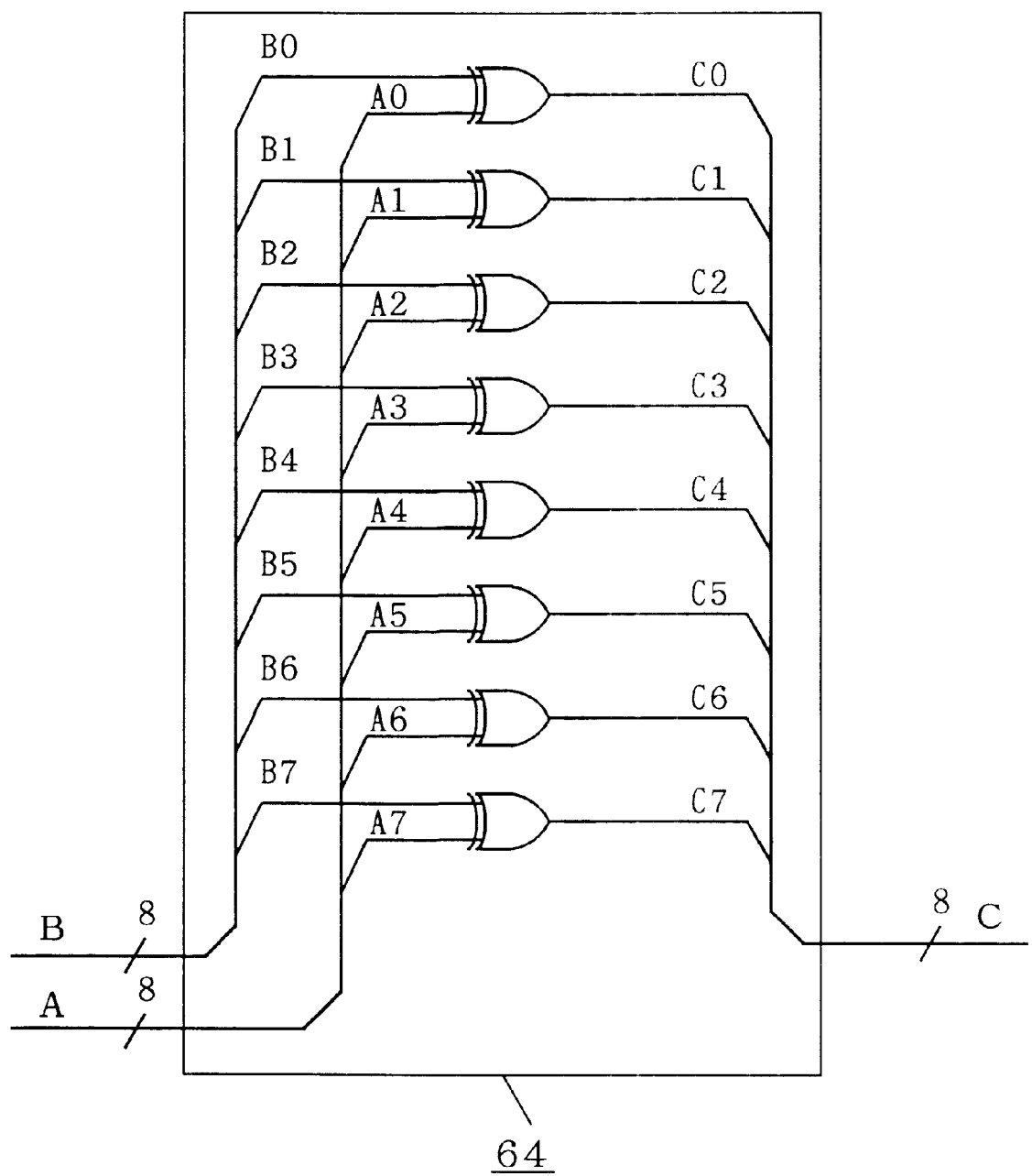
FIG. 23 is a block diagram of an operation circuit of FIG. 19.

FIG. 23 is a circuit diagram showing an example of an internal structure of a normal operation circuit 64 (and 84). In this example, the operation circuit 64 comprises eight exclusive OR circuits. 1-byte data A (=A0 to A7) held in the register 61 are inputted in single inputs thereof, and 1-byte data B (=B0 to B7) held in the register 62 are inputted in other inputs.

1-byte data C (=C0 to C7) calculated as exclusive OR thereof are inputted in the register 65 as an output signal. If both of the rewrite machine 50 and the game cassette 70 are normal apparatuses, both of the operation circuits 64 and 84 comprised therein are structured as the circuit diagram of FIG. 23, for example.

Then, at a step S7, the CPU 51 reads the data held in the register 85, and writes the same in the register 63. Around this, the CPU 51 reads the data held in the register 65 and writes the same in the register 83 at a step S8.

Then, at a step S9, the comparator 66 compares the data held in the two registers 63 and 65 with each other, and determines whether or not the same coincide with each other. Then, data expressing the result of the determination is written in the register 67. The data written in the register 67 is transmitted to the CPU 51.

Simultaneously with the step S9, the comparator 86 compares the data held in the two registers 83 and 85 with each other, and determines whether or not the same coincide with each other at a step S10. Then, data indicating the result of the determination is written in the register 87. The data written in the register 87 is transmitted to the control signal output part 88 and the CPU 51.

If the data written in the registers 67 and 87 are data expressing determination results of non-coincidence, the processing shifts to a step S11. At the step S11, the CPU 51 stops all processing. Further, the control signal output part 88 holds a state of transmitting no write authorization signal WPM. Since the write authorization signal WPM is not inputted, the memory control part 75 performs no writing into the flash memory 72 even if the write enable signal WR, the data signal DT or the address signal ADR1 is inputted from the rewrite machine 50. Namely, the flash memory 72 is kept in a state of write inhibition.

If the data written in the registers 67 and 87 are data expressing determination results of coincidence, the processing shifts to a step S12. At the step S12, the control signal output part 88 outputs the write authorization signal WPM on the basis of the data written in the register 87. Consequently, the memory control part 75 sets the flash memory 72 in a writable state. However, only writing from the memory control part 75 becomes possible, and writing from the CPU 51 is kept inhibited.

The control signal output part 88 outputs a signal instructing starting of the test of the flash memory 72 as the internal flash control signal CNT1, simultaneously with outputting of the write authorization signal WPM. In response to this signal, the memory control part 75 executes writing of prescribed data with respect to the flash memory 72. The prescribed data are previously prepared in the memory control part 75.

Then, at a step S13, the memory control part 75 reads the data written in the flash memory 72, and compares the read data with the prescribed data. The result of the comparison is transmitted to the CPU 51. When non-coincidence is confirmed as the result of the comparison, the CPU 51 determines that there is abnormality in the hardware of the flash memory 72, and shifts the processing to the aforementioned step S11. At the same time, the memory control part 75 inhibits writing into the flash memory 72, similarly to the time when no write authorization signal WPM is inputted. When coincidence is confirmed as the result of the comparison, the processing shifts to a step S14.

At the step S14, the memory control part 75 sets the flash memory 72 in a state allowing writing from the CPU 51. Then, the CPU 51 executes writing of the prescribed data with respect to the flash memory 72. Thereafter at a step S15, the CPU 51 reads the data written in the flash memory 72, and compares the read data with the prescribed data.

When non-coincidence is confirmed as the result of the comparison, the CPU 51 determines that there is abnormality in the flash memory 72 or any hardware such as the memory control part 75 concerning the write operation in the flash memory 72, and shifts the processing to the aforementioned step S11. At this time, the CPU 51 controls the memory control part 75 so that the memory control part 75 inhibits writing in the flash memory 72. When coincidence is confirmed as the result of the comparison, the processing shifts to a step S16.

At the step S16, the data of the program stored in the storage part 57 are written in the flash memory 72 by the CPU 51. Thus, the data of the program stored in the flash memory 72 are rewritten to data of a new program. When the writing is completed, all processing is ended.

Also when no data setting is performed at the steps S3 and S4, no data as operation results are read at the steps S5 and S6, or no setting of operation results is performed at the steps S7 and S8, two operation results do not generally coincide with each other in determinations at the steps S10 and S11, and hence writing in the flash memory 72 is inhibited as a result.

As hereinabove described, the rewrite machine 50 and the game cassette 70 are so structured as to prevent writing in the flash memory 72 when at least one of these apparatuses is illegal (not a normal apparatus) in this embodiment.

Figure 24:
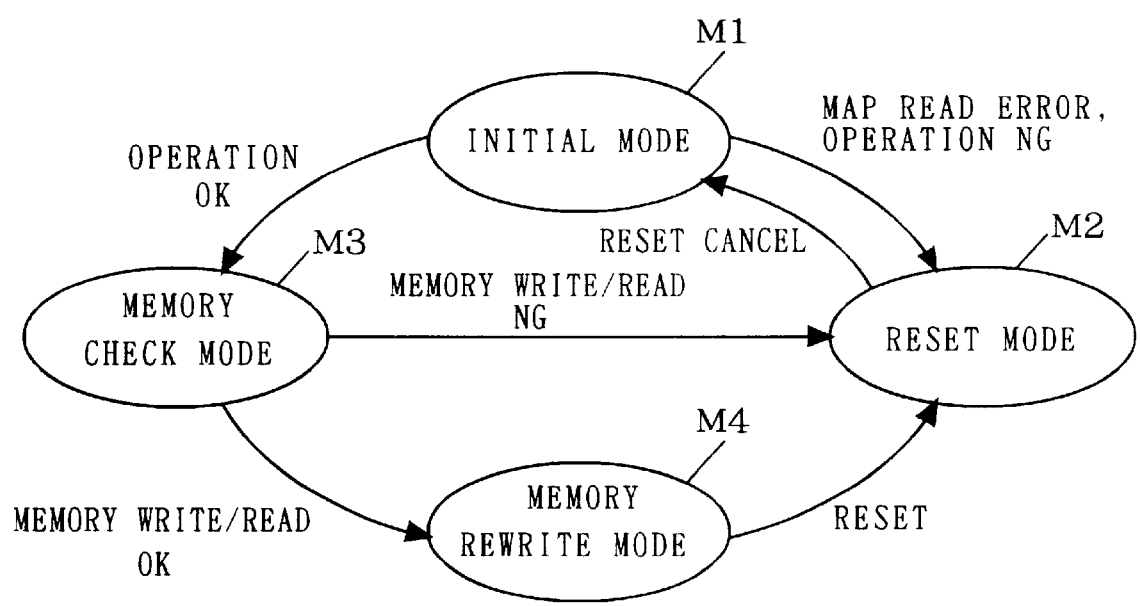
FIG. 24 is a state transition diagram of a memory control part of FIG. 20.

Following the aforementioned operations, the memory control part 75 of the game cassette 70 properly transits between a plurality of states. FIG. 24 is a state transition diagram illustrating this. When power is supplied, an operation mode of the memory control part 75 first becomes an initial mode M1. Namely, the initial mode M1 is default. In this initial mode M1, a memory map is created. The detail of creation of the memory map has already been illustrated with quotation of FIG. 10. While omitted in the illustration of the step S2, the memory control part 75 inhibits writing with respect to the flash memory 72 also when creation of the memory map is not normally performed.

The initial mode M1 corresponds to the operations of the memory control part 75 at the steps S1 to S10. When the result of the comparison at the step S10 is non-coincidence, or when the aforementioned creation of the memory map is not normally performed, the operation mode transits from the initial mode M1 to a reset mode M2. In the reset mode M2, writing in the flash memory 72 is inhibited, while all operations stop. The reset mode M2 does not transit to the initial mode M1 unless an operation of reset cancel is performed from the exterior.

If there is no problem in the result of the comparison at the step S10, the operation mode transits from the initial mode M1 to a memory check mode M3. When transiting to the memory check mode M3, writing from the memory control part 75 to the flash memory 72 becomes possible, while writing from the CPU 51 is still inhibited by the memory control part 75.

The memory check mode M3 corresponds to the operations at the steps S12 to S13. The operation mode transits to the reset mode M2 if there is a problem in the result of the determination by the step S13, or transits to a memory rewrite mode M4 if there is no problem.

In the memory rewrite mode M4, writing from the CPU 51 in the flash memory 72 is authorized. Then, the processing at the steps S14 to S16 is performed. Namely, the test of the flash memory 72 by the CPU 51, and rewriting of the program data are performed.

If there is a problem in the result of the test of the flash memory 72 at the step S15, the operation mode transits to the reset mode M2 at this point of time. If there is no problem in the test at the step S15, it transits to the reset mode M2 after rewriting of the program data is performed. In case of assembling the game cassette 70 into the game machine body and using the same, the operation mode transits to the initial mode M1. Namely, general use as a game machine becomes possible in the initial mode M1.

In the memory rewrite mode M4, the memory control part 75 sets the flash memory 72 in a readable state, whereby it is possible to read the data of the program stored in the flash memory 72 to the game machine body. As hereinabove described, the memory control part 75 of the game cassette 70 is structured to transit between a plurality of states.

In the above description, such examples that the game cassette 70 and the rewrite machine 50 are structured as elements of the game program supply system has been shown. However, it is also possible to structure a portable rewrite medium having a semiconductor memory rewritably storing not only data of game programs but data of programs in general and a rewrite machine rewriting data of programs in this rewrite medium similarly to the game cassette 70 and the rewrite machine 50 respectively. Namely, the present invention is executable not only for a game program supply system but generally with respect to a program rewrite system.

What is claimed is:

1. A program rewrite system for rewriting data of a program, comprising:
   a rewrite machine; and
   a rewrite medium configured to be recycled by rewriting the contents thereof comprising,
      a semiconductor memory configured to rewritably store data of a program,
      a memory control part configured to control operation of said semiconductor memory and to change between a plurality of operation modes including a mode authorizing writing to said semiconductor memory and a mode inhibiting the same, and
      an operation circuit and a comparator;
   said operation circuit is configured to execute an operation with respect to data sent from said rewrite machine;
   said comparator is configured to perform a comparison between data of an operation result of said operation circuit and data sent from said rewrite machine;
   said plurality of operation modes are first to fourth operation modes (M1 to M4);
   said memory control part is configured to first enter said first operation mode when said rewrite medium is connected to said rewrite machine, to inhibit writing into said semiconductor memory in said first operation mode, and to change to said second operation mode when two data compared by said comparator do not coincide with each other, or to change to said third operation mode when the two data do coincide with each other;
   said memory control part is configured to stop its operation while inhibiting writing to said semiconductor memory in said second operation mode;
   said memory control part is configure to authorize writing to said semiconductor memory only with respect to writing from said memory control part in said third operation mode, to write prescribed data to said semiconductor memory, to read data and to change to said second operation mode when the read data do not coincide with each other, or to change to said fourth operation mode when the read data do coincide with each other; and
   said memory control part is configured to authorize writing from said rewrite machine to said semiconductor memory in said fourth operation mode.

2. A game program supply system, comprising:
   a game program data rewrite device comprising a storage device configured to store game program data; and
   a portable information storage medium configured to be connected to a game execution unit and in order to enable the same to execute the game program data and to be recycled by rewriting the contents thereof, and comprising, a specification selection circuit configured to access a memory map of the game program data in order to determine whether the memory map of the game program data is compatible with reference to a predetermined memory map and to convert the memory map of the game program data such that game program data can be executed by the game execution unit if the memory map is not compatible; wherein said game program data rewrite device further comprises a write device configured to write the game program data stored in said storage device into the portable information storage medium.

3. The game program supply system in accordance with claim 2, wherein said portable information storage medium is a game cassette.

* * * * *